US012572366B1

(12) United States Patent
Paul et al.

(10) Patent No.: US 12,572,366 B1
(45) Date of Patent: Mar. 10, 2026

(54) IN-FIELD DEVICE MIGRATION BETWEEN OPERATING SYSTEMS

(71) Applicant: Google LLC, Mountain View, CA (US)

(72) Inventors: Marvin Wilhelm Max Paul, Castro Valley, CA (US); Michael Tre'onnis Brunson, II, Mountain View, CA (US); David Haloni, San Jose, CA (US); Ashley Aaron Coleman, Sunnyvale, CA (US); Alex Daniel Yeung Wong, San Jose, CA (US); Gordon Yenho Tsai, Brea, CA (US); Yuhan Zhang, Santa Clara, CA (US); Justin Charles Mattson, San Francisco, CA (US)

(73) Assignee: Google LLC, Mountain View, CA (US)

( * ) Notice: Subject to any disclaimer, the term of this patent is extended or adjusted under 35 U.S.C. 154(b) by 220 days.

(21) Appl. No.: 18/143,180

(22) Filed: May 4, 2023

Related U.S. Application Data

(60) Provisional application No. 63/339,585, filed on May 9, 2022.

(51) Int. Cl.
*G06F 9/4401* (2018.01)
*G06F 8/61* (2018.01)
*G06F 8/65* (2018.01)

(52) U.S. Cl.
CPC .............. *G06F 9/4406* (2013.01); *G06F 8/63* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 8,225,133 | B1 | 7/2012 | Lyadvinsky et al. | |
| 9,122,653 | B2 | 9/2015 | Fleming et al. | |
| 10,936,719 | B2 | 3/2021 | Sibert et al. | |
| 2013/0047031 | A1* | 2/2013 | Tabone | G06F 9/4403 714/15 |

(Continued)

OTHER PUBLICATIONS

A/B (Seamless) System Updates | Android Open Source Project, https://source.android.com/devices/tech/ota/ab, retrieved from the internet on Apr. 20, 2022, pp. 1-10.

(Continued)

*Primary Examiner* — Ryan D. Coyer
(74) *Attorney, Agent, or Firm* — Botos Churchill IP Law

(57) ABSTRACT

The technology involves migration of computing devices from one operating system to a different operating system, e.g., via an over-the-air (OTA) process. The migration at the device can be done autonomously without human input, while managing resource issues such as limited memory size or different memory types. A sequence of builds may be employed depending on the type of device that undergoes migration. A backend migration service can provide an airlock feature to migrate devices in batches, for instance should fractional migration be employed for many devices in a product line. The airlock approach provides a handshake between devices and an update service irrespective of which batch a given computing device is in. This enables the OTA process to support batch OS migration for thousands of computing devices or more, while ensuring that changes to each computing device are accounted for.

20 Claims, 23 Drawing Sheets

(56) References Cited

U.S. PATENT DOCUMENTS

| | | | |
|---|---|---|---|
| 2018/0136940 A1* | 5/2018 | Mallichan ................. | G06F 8/61 |
| 2019/0042368 A1* | 2/2019 | Khatri ................... | G06F 21/554 |
| 2019/0079746 A1* | 3/2019 | Thomas ............... | G06F 21/572 |
| 2021/0089327 A1* | 3/2021 | Vasilik ................. | G06F 9/4411 |

OTHER PUBLICATIONS

OTA Updates for Remote Devices—Different Methods Explained, OTA Updates for Remote Devices—Different Methods Explained—JFrog Connect, retrieved from the Internet on Apr. 20, 2022, pp. 1-13.

SystemupdaterSample, Google Git, updater_sample—platform/bootable/recovery—Git at Google, retrieved from the Internet on Apr. 20, 2022, pp. 1-5.

* cited by examiner

Kernel - Recovery

Kernel - B

Kernel - A

OS Volume Manager

Fig. 5A

Recovery

Boot

System

Cache

500

600

700

720

Data Distribution — 722

Platform Data — 724

Product Data — 726

Volume
Locale
Accessibility/A11y
Display Settings
Do No Distrub — 728

WLAN
Bluetooth — 730

App Specific Data — 732

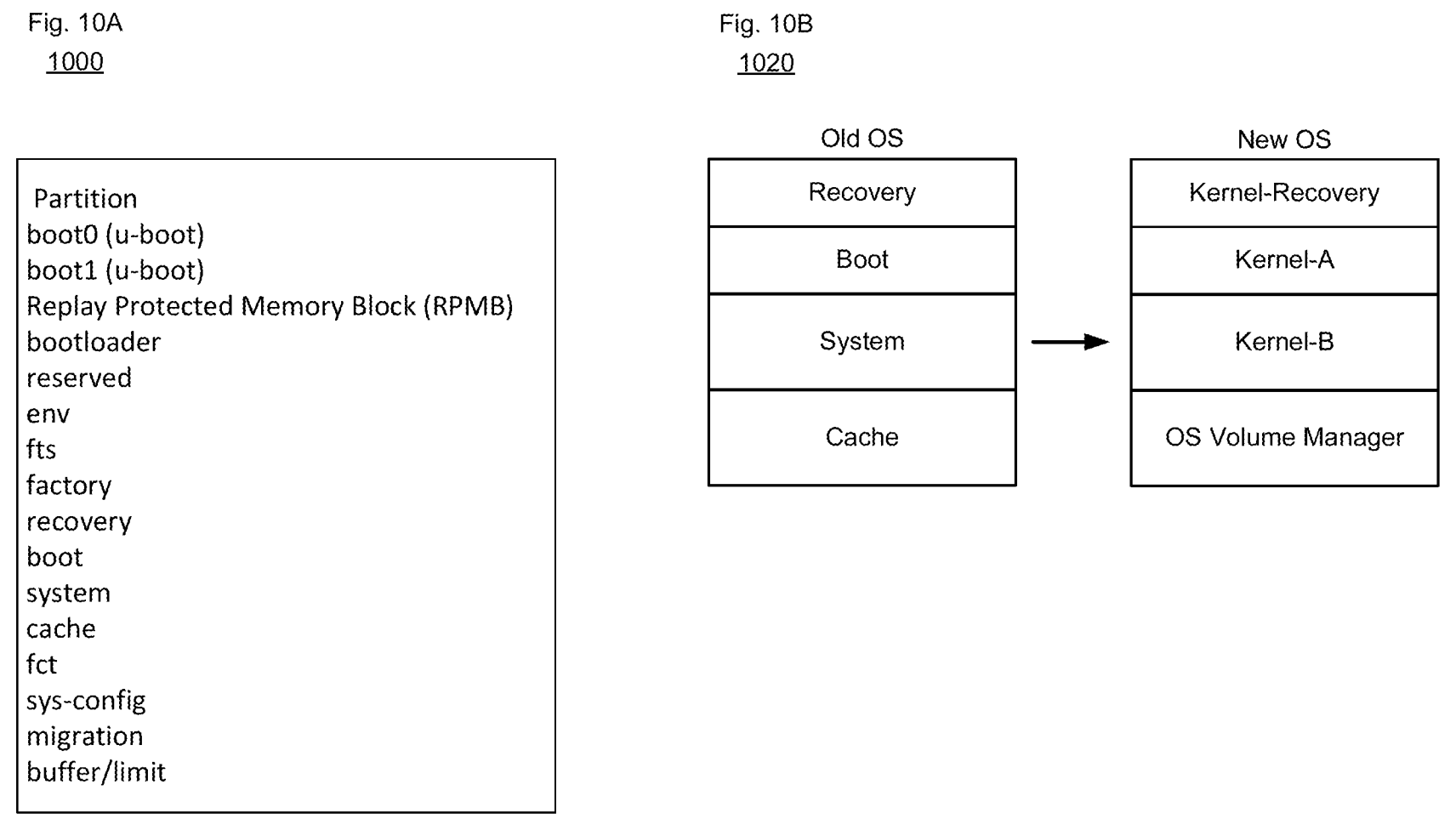

Old OS

| Recovery |
| Boot |
| System |
| Cache |

New OS

| Kernel-Recovery |
| Kernel-A |
| Kernel-B |
| OS Volume Manager |

Fig. 10A
1000

Partition
boot0 (u-boot)
boot1 (u-boot)
Replay Protected Memory Block (RPMB)
bootloader
reserved
env
fts
factory
recovery
boot
system
cache
fct
sys-config
migration
buffer/limit

1100

1200

1300

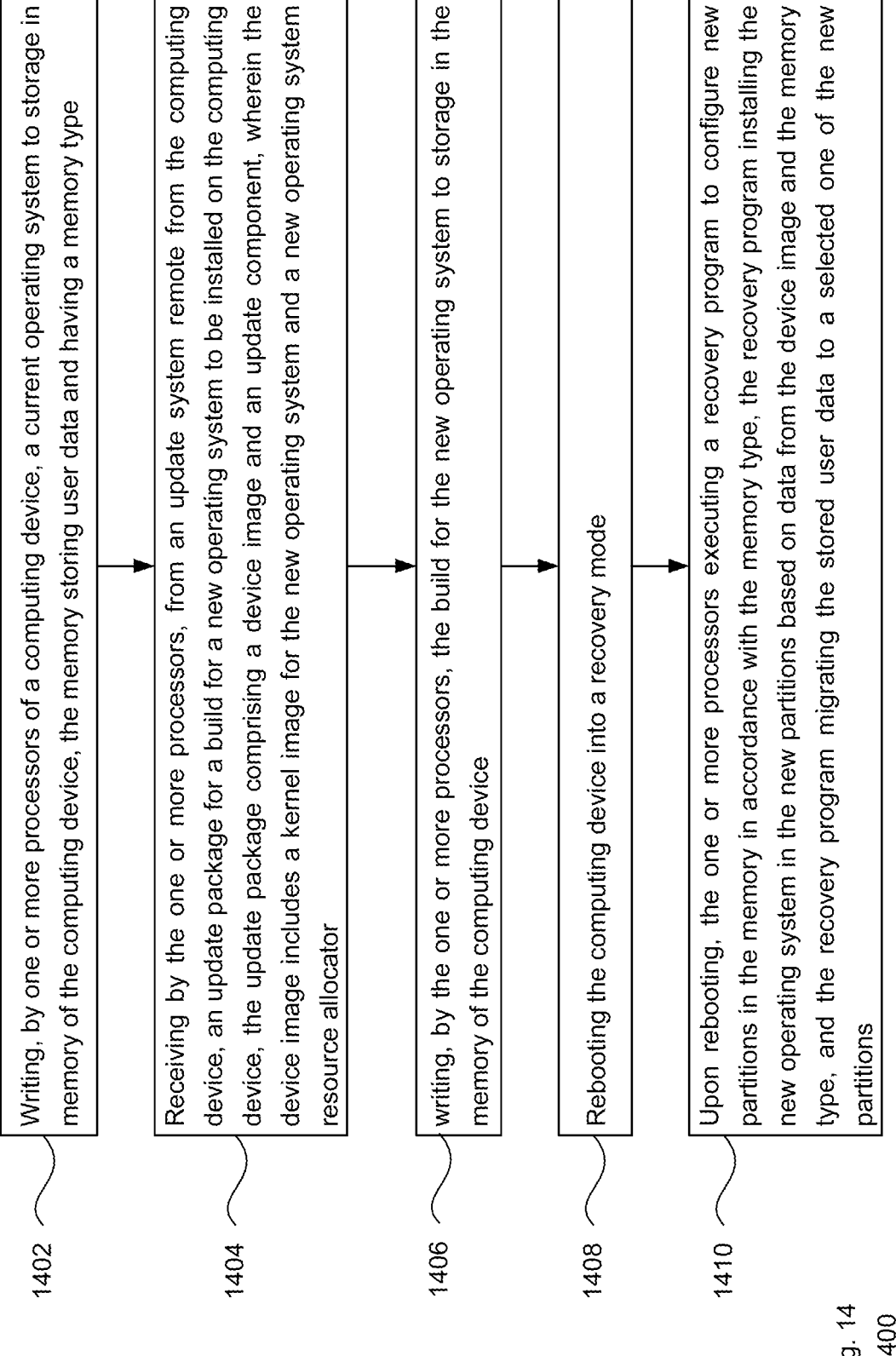

1402   Writing, by one or more processors of a computing device, a current operating system to storage in memory of the computing device, the memory storing user data and having a memory type 1404   Receiving by the one or more processors, from an update system remote from the computing device, an update package for a build for a new operating system to be installed on the computing device, the update package comprising a device image and an update component, wherein the device image includes a kernel image for the new operating system and a new operating system resource allocator 1406   writing, by the one or more processors, the build for the new operating system to storage in the memory of the computing device 1408   Rebooting the computing device into a recovery mode 1410   Upon rebooting, the one or more processors executing a recovery program to configure new partitions in the memory in accordance with the memory type, the recovery program installing the new operating system in the new partitions based on data from the device image and the memory type, and the recovery program migrating the stored user data to a selected one of the new partitions Fig. 14
1400

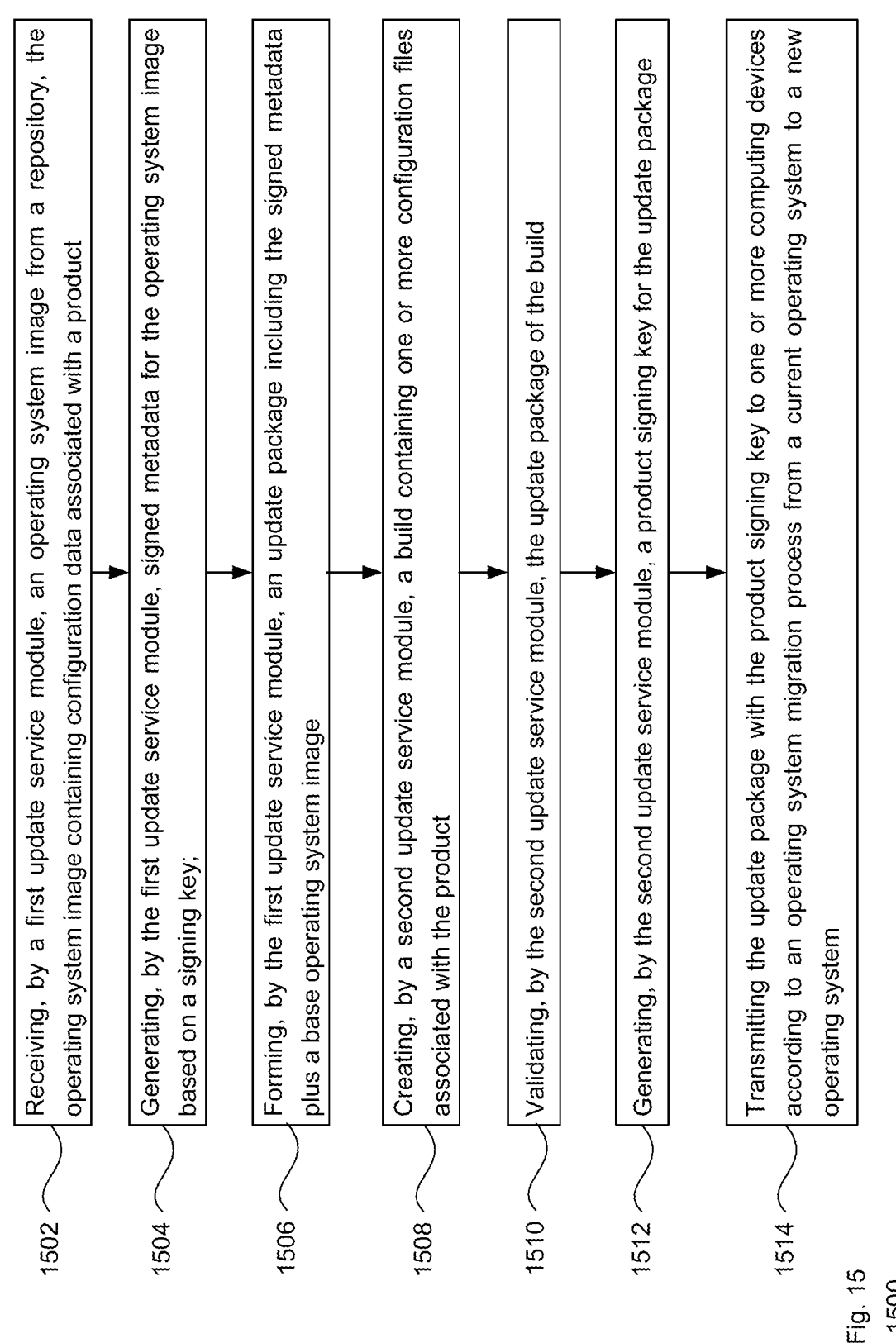

1502    Receiving, by a first update service module, an operating system image from a repository, the operating system image containing configuration data associated with a product 1504    Generating, by the first update service module, signed metadata for the operating system image based on a signing key;

1506    Forming, by the first update service module, an update package including the signed metadata plus a base operating system image 1508    Creating, by a second update service module, a build containing one or more configuration files associated with the product 1510    Validating, by the second update service module, the update package of the build 1512    Generating, by the second update service module, a product signing key for the update package 1514    Transmitting the update package with the product signing key to one or more computing devices according to an operating system migration process from a current operating system to a new operating system Fig. 15
1500

IN-FIELD DEVICE MIGRATION BETWEEN OPERATING SYSTEMS

CROSS-REFERENCE TO RELATED APPLICATIONS

This application claims the benefit of the filing date and priority to U.S. Provisional Patent Application No. 63/339,585, filed May 9, 2022, the entire disclosure of which is incorporated herein by reference.

BACKGROUND

Over-the-Air (OTA) updates are employed on many different kinds of computing devices, including consumer electronics, mobile phones, vehicles, industrial equipment, etc. Such updates use a wireless link to efficiently provide current firmware, software or other data to the devices rather than having to physically connect the device via a data cable or insert a storage medium (e.g., a USB drive or CD-ROM). This can include updates for system elements, application software, and time zone rules. The size or type of the update may affect how it is implemented. For instance, system updates that require a large fraction of onboard memory may be performed using an A/B approach, in which the computing device has two copies of each hard drive partition (A and B) and can apply an update to the currently unused partition while the system is running but idle. These types of devices would not need memory space to download the update package because the update can be applied as it is received from the network.

In some situations, it can be desirable to change not just an app or a portion of the firmware, but to change an entire operating system (OS). For example, a first generation of a product may ship with a first type of operating system (e.g., a Linux-based operating system), but subsequent generations may ship with a different type of operating system. In such situations, having many devices with different (and potentially incompatible) operating systems could prevent consistent support across the entire product line. In addition, rolling out the change across thousands or millions of devices, including keeping track of which devices have been updated, can be complex and challenging for the manufacturer or other provider of the devices. In addition, the process for a complete operating system change may be constrained not only by the amount of onboard memory available, but the specific type of memory. If there is a failure during the OTA process, the device may become "bricked" and completely unusable. Thus, there can be significant technical complexity to properly performing an OTA operating system replacement at scale on many devices.

BRIEF SUMMARY

Aspects of the technology involve the migration of computing devices in the field from one operating system to a different operating system via an OTA process. The migration is applicable to different versions of one product such as an at-home assistant device, as well as different types of products such as netbooks, tablets or other laptop-type devices, mobile phones, smart speakers, smart displays, wearable devices, home appliances, etc. The migration at the device can be done autonomously without any human input, while managing resource issues such as limited memory size or different memory types. A sequence of builds may be employed depending on the type of device that undergoes the OTA operating system image migration. Interaction with a backend migration service can include providing an airlock feature, which allows for migrating devices in batches and to better control the number of devices in each batch, for instance should fractional migration be employed for many devices in a product line, for instance by sequentially migrating different sets (tranches) of devices. The airlock approach provides a handshake between devices and an update service irrespective of which batch a given computing device is in. This enables the OTA process to support batch OS migration for thousands of computing devices or more, while ensuring that changes to each computing device are accounted for.

According to one aspect of the technology, a computer-implemented method comprises writing, by one or more processors of a computing device, a current operating system to storage in memory of the computing device, the memory storing user data and having a memory type: receiving by the one or more processors, from an update system remote from the computing device, an update package for a build for a new operating system to be installed on the computing device, the update package comprising a device image and an update component, wherein the device image includes a kernel image for the new operating system and a new operating system resource allocator: writing, by the one or more processors, the build for the new operating system to storage in the memory of the computing device: rebooting the computing device into a recovery mode; and upon rebooting, the one or more processors executing a recovery program to configure new partitions in the memory in accordance with the memory type, the recovery program installing the new operating system in the new partitions based on data from the device image and the memory type, and the recovery program migrating the stored user data to a selected one of the new partitions.

In one example, receiving the update package comprises receiving an over-the-air update from the update system. Alternatively or additionally, executing the recovery program includes: creating a new operating system kernel boot image: writing the new operating system kernel boot image to a reserved migration partition in the memory: reading the new operating system kernel boot image from the migration partition; and packing data into one or more interfaces in a process communication system of the new operating system for distribution from the migration partition to corresponding portions of memory associated with the new operating system boot image. Here, the distribution may include distribution of platform data associated with the computing device and product data associated with one or more application features for applications to be run on in the new operating system. The platform data may include a first set of application programming interfaces (APIs) to configure system-wide settings in the new operating system and a second set of APIs to configure one or more system-level components. The product data may include one or more APIs for exposing selected data to application-level components configured to run in the new operating system.

Alternatively or additionally with any of the above processes, the method may further comprise: prior to writing the current operating system to storage, downloading an airlock update to the computing device, wherein the airlock update includes a build having a partial rollout for the current operating system; and applying the airlock update for the current operating system. Alternatively or additionally with any of the above processes, executing the recovery program may include: writing a kernel for the new operating system to a boot partition of the memory according to the kernel image, writing the new operating system resource allocator to remaining space of a system partition of the memory, writing boot metadata to the memory, and moving the user data to a partition in the memory associated with the new operating system. Here, executing the recovery program may further include updating a globally unique identifiers (GUID) partition table (GPT) associated with the memory.

Alternatively or additionally with any of the above processes, upon interruption of the method, the method may further comprise: falling back to a partition table of the current operating system; and restarting execution of the recovery program. Alternatively or additionally with any of the above processes, the build for the new operating system may be a base build, and the method may further comprise, upon executing the recovery program and installing the base build: downloading a full build for the new operating system; and updating the operating system from the base build to the full build. Here, updating from the base build to the full build may include: updating a bootloader for the new operating system: replacing a recovery partition for the current operating system with a kernel recovery partition for the new operating system: updating a B copy of the system kernel: updating system configuration data with verified boot information for the B copy of the system kernel, which holds a key and descriptors needed during startup to verify integrity of the OS image; and rebooting the computing device into the full build of the new operating system. This approach may further comprise: downloading a most current build for the new operating system; and updating the new operating system from the full build to the most current build. In this case, updating from the full build to the most current build may include: updating the bootloader for the new operating system: updating the kernel recovery partition for the new operating system: updating an A copy of the system kernel: updating system configuration data with verified boot information for the A copy of the system kernel; and reboot the computing device into the most current build of the new operating system.

Alternatively or additionally with any of the above processes, the memory type may be an unmanaged memory type wherein the method further comprises implementing a flash translation library to provide block management for the unmanaged memory type. Alternatively, the memory type may be a managed memory type.

Alternatively or additionally with any of the above processes, the update component may include a set of update binaries and metadata about the update. Alternatively or additionally with any of the above processes, the new operating system resource allocator may be a new operating system volume manager. Here, the device image may further include one or more host tools configured to handle user data and write the new operating system volume manager.

According to another aspect of the technology, a computing device comprises: memory configured to store operating system information and user data in a set of partitions, in which the memory has a memory type; and one or more processors operatively coupled to the memory. The one or more processors are configured to: write a current operating system of the computing device to storage in the memory of the computing device: receive, from an update system remote from the computing device, an update package for a build for a new operating system to be installed on the computing device, the update package comprising a device image and an update component, wherein the device image includes a kernel image for the new operating system and a new operating system resource allocator: write the build for the new operating system to storage in the memory of the computing device: reboot the computing device into a recovery mode; and upon reboot, execute a recovery program to configure new partitions in the memory in accordance with the memory type, the recovery program configured to install the new operating system in the new partitions based on data from the device image and the memory type, and to migrate the stored user data to a selected one of the new partitions. The memory type may be either an unmanaged memory type or a managed memory type.

According to a further aspect of the technology, an update service system comprising a backend update service and a product update service. The backend update service includes: an update service server configured to manage one or more of products, builds and updates, the update service server configured to receive operating system images from an operating system repository, the operating system images containing configuration data associated with a product; and a signing server configured to receive information associated with the operating system images from the update service server, wherein the signing server is configured to generate signed metadata for each operating system image based on a signing key and return the signed metadata to the update service server. The update service server is configured to form an update package including the signed metadata from the signing server plus a base operating system image from the operating system repository. The product update service includes an operating system update builder configured to receive the update package from the backend update service and to create a build containing one or more configuration files associated with the product; and a product signing server configured to receive the build from the operating system update builder, to validate the update package of the build and to generate a product signing key for the update package. The update service system is configured to transmit the update package with the product signing key to one or more computing devices according to an operating system migration process from a current operating system to a new operating system.

In one example, the product update service further comprises a new operating system repository that is configured to store a plurality of update packages and a plurality of product signing keys each associated with one of the plurality of update packages, a first one of the plurality of update packages being a base build for the new operating system to be installed on the one or more computing devices, and a second one of the plurality of update packages being a full build to be installed on the one or more computing devices upon installation of the base build. The update service system may be further configured to store an airlock update for the current operating system of the one or more computing devices, the airlock update including a build having a partial rollout for the current operating system for installation prior to updating to the new operating system. The one or more computing devices may be pointed to one portion of the update service system to obtain the airlock update, and may be pointed to a different portion of the update service system to obtain the update package associated with the new operating system.

Alternatively or additionally with any of the above configurations for the update service system, the one or more computing devices may be a plurality of computing devices, in which the update service system is configured to migrate the plurality of computing devices from the current operating system to the new operating system in one or more tranches. Here, the update service system may be configured to migrate the plurality of computing devices to the new operating system via an over-the-air update process.

According to a further aspect of the technology, a method comprises: receiving, by a first update service module, an operating system image from a repository, the operating system image containing configuration data associated with a product: generating, by the first update service module, signed metadata for the operating system image based on a signing key: forming, by the first update service module, an update package including the signed metadata plus a base operating system image: creating, by a second update service module, a build containing one or more configuration files associated with the product: validating, by the second update service module, the update package of the build: generating, by the second update service module, a product signing key for the update package: transmitting the update package with the product signing key to one or more computing devices according to an operating system migration process from a current operating system to a new operating system.

BRIEF DESCRIPTION OF THE DRAWINGS

FIGS. 5A-B illustrate an example of disk space and partitions for a current OS and for a new OS, in accordance with aspects of the technology.

FIG. 9 illustrates a disk partitioning example for devices having memory cards in accordance with aspects of the technology.

FIGS. 10A-B illustrate an example partition layout and partition mapping in accordance with aspects of the technology.

FIG. 14 illustrates a method in accordance with aspects of the technology.

FIG. 15 illustrates another method in accordance with aspects of the technology.

DETAILED DESCRIPTION

Overview

The technology provides an OTA migration process for changing an operating system operative on a computing device, e.g., replacing a first operating system on the device with a second operating system, or pushing the second operating system onto the device that already includes the first operating system. There is a significant technical benefit to replacing or updating a previously installed operating system, including supporting different applications or system features, streamlining the system operation, addressing bugs in earlier versions of the operating system, etc. This process can be done using a sequence of operating system builds, in which each build represents the set of configurations associated with an operating system image to be shipped via an OTA update. Each build may contain one or more configuration (config) files associated with a particular product platform (e.g., a specific laptop model or an at-home assistant device) that are overlaid on top of a base OS image. The technology may employ one or more channels that enable pushing builds to a group of devices subscribed to the corresponding channels. A particular product can have any number of channels.

Example Computing Devices

Figure 1A:
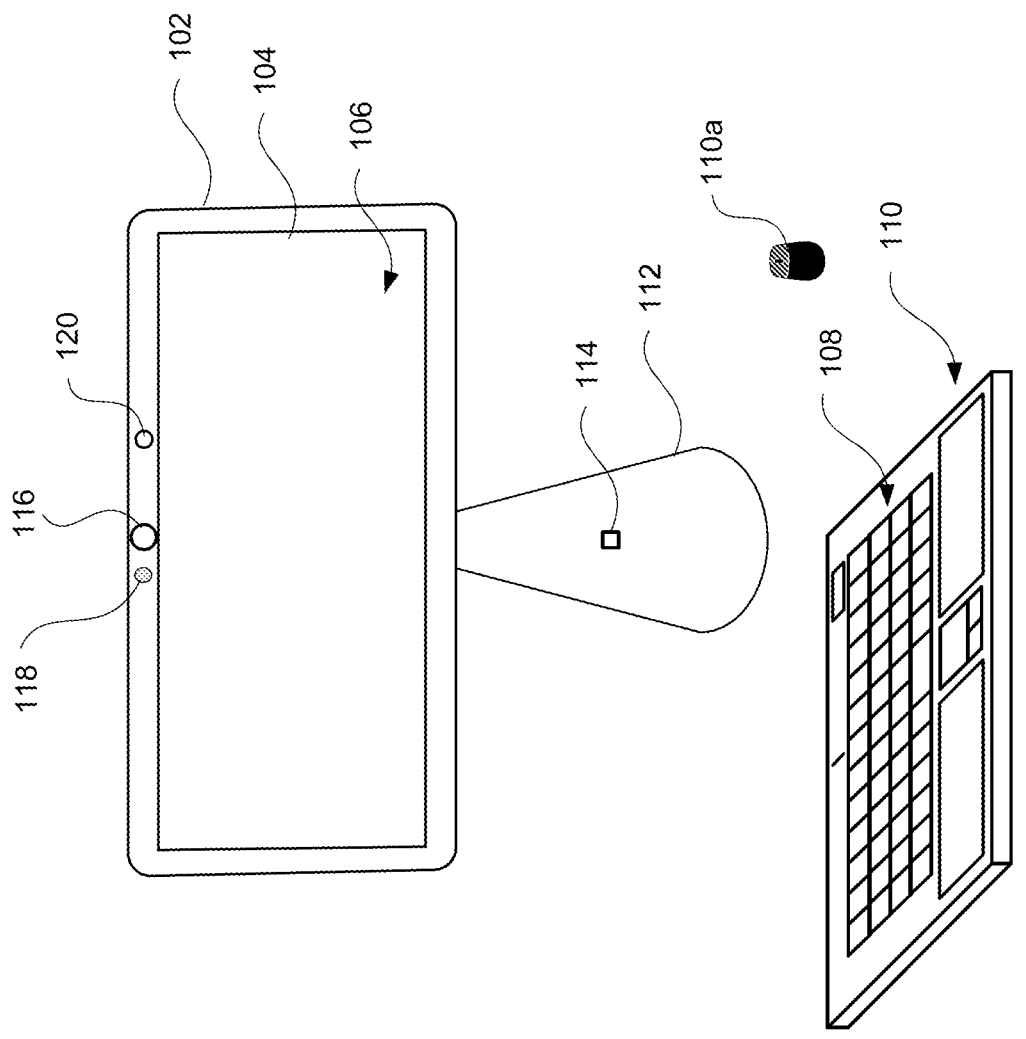
FIGS. 1A-C illustrates example computing devices which can be employed in accordance with aspects of the technology.

FIG. 1A illustrates a view: 100 of an example desktop-type computing device 102. In this example, a single display 104 is shown, although multiple display devices may be supported. In one scenario, the display 104 may be configured for tactile input using a stylus or touch input with the user's finger(s) to interact with a graphical user interface (GUI) 106 presented on the display. As shown, the computing device 102 may employ a wireless keyboard 108 and/or one or more trackpads or mousepads 110, which may be part of one unit or the keyboard may be separate from the trackpad/mousepad or a mouse-based input 110a. Alternatively, the keyboard and/or other user inputs may have a wired connection to the computing device 102. As shown in this example, the computing device has a stand 112. One or more microphones 114 may be disposed along the stand and/or disposed along the housing of the integrated client device 102. While the computing device may be fixedly mounted to the stand 112, in an alternative configuration the screen (with the integrated components) can be detached from the stand, allowing a user to carry around the home and use remotely based on battery power. In other words, the client device can comprise an integrated housing that is (optionally removably or releasably) coupled to the stand 112.

In this example, a webcam or other integrated camera 116 that may include a privacy shutter or other feature to disable image-taking is positioned along the housing of the computing device 102, which can be used for videoconferences, interactive gaming, etc. Indicator 118, such as an LED, may be illuminated to alert a user whenever the webcam 116 is in use. The integrated client device may include a separate camera or other imaging device 120 that is part of a presence sensor. As shown, the webcam 116 and the imaging device 120 may each be positioned along a top bezel of the integrated client device housing. In some examples these devices may be located in different positions along the integrated housing. The integrated camera 116 may be used as part of the presence sensor instead of or in addition to imaging device 120. In other words, the presence sensor comprises an image sensor configured to take one or more images. The presence sensor can be configured to detect presence of one or more people within a threshold distance from the client computing device. For example, the presence sensor includes the image sensor, as discussed herein, and the client device is configured to detect the presence of one or more people in imagery (images) taken by the image sensor.

Figure 1B:
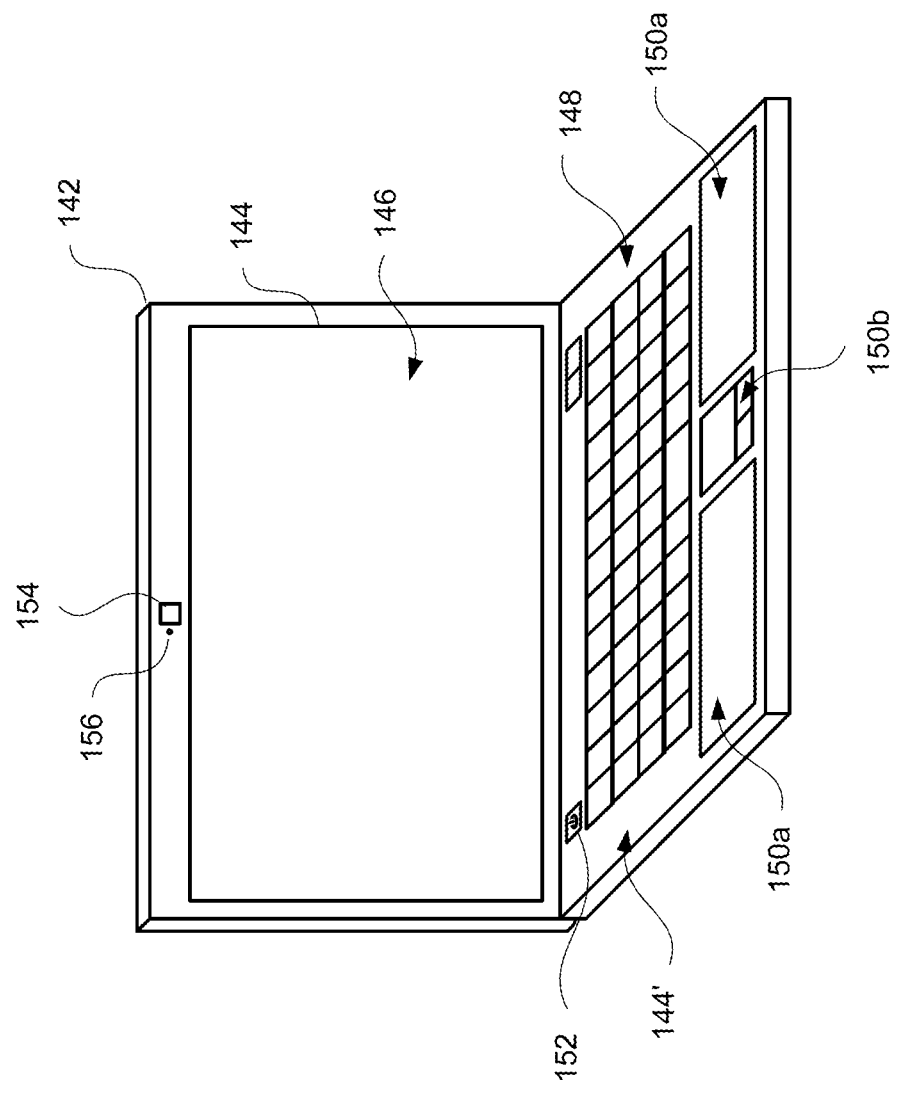

FIG. 1B illustrates view 140 of an example laptop computer 142, such as a netbook. In this example, a display 144 is shown. In one scenario, the display 144 may be configured for tactile input using a stylus or touch input with the user's finger(s) to interact with a graphical user interface (GUI)

146 presented on the display. As shown, the laptop 142 may employ a keyboard 148 and/or one or more trackpads 150*a* and/or mousepads 150*b*. These input devices 148 and 150 may be virtual input devices presented on a second display 144'. In this case, the laptop computer 142 may also function as a dual-screen device. One or more microphones 152 may be disposed along the housing of the computer 142. The laptop computer 142 may include a webcam or other integrated camera 154 that may include a privacy shutter or other feature to disable image-taking is positioned along the housing, which can be used for videoconferences, interactive gaming, etc. Indicator 156, such as an LED, may be illuminated to alert a user whenever the webcam 154 is in use. Similar to the computing device 102, the laptop computer 142 may include a separate camera or other imaging device, other than the webcam 154, that is part of a presence sensor.

Figure 1C:
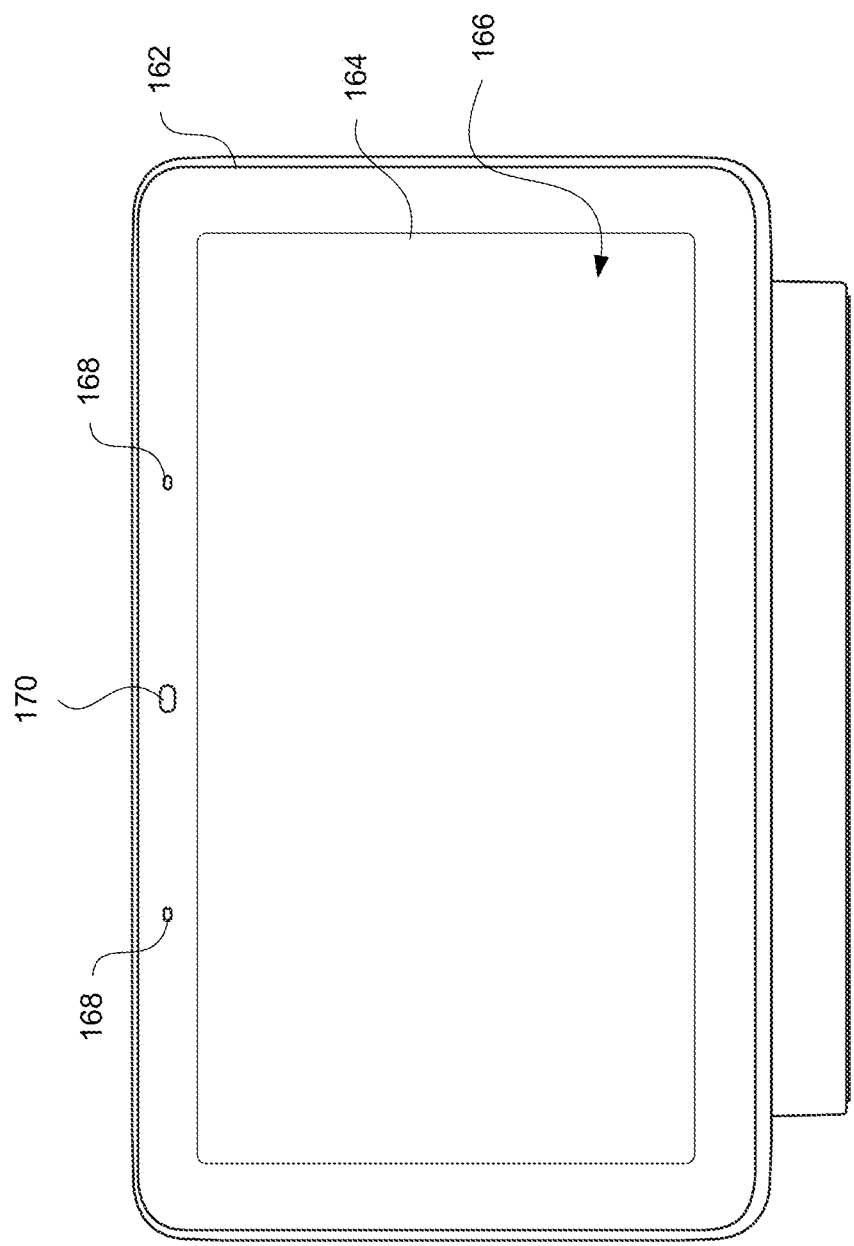

FIG. 1C illustrates view: 160 of an example interactive home appliance 162, such as an at-home assistant device. In this example, a display 164 is shown. In this example, the appliance 162 does not include a keyboard. In one scenario, the display 164 may be configured for tactile input using a stylus or touch input with the user's finger(s) to interact with a graphical user interface (GUI) 146 presented on the display. Alternatively or additionally to this, the interactive home appliance 162 may be configured to detect contactless gesture input, such as using a close range radar sensor (not shown), acoustical sensors (e.g., a microphone array) 168, cameras such as webcam 170, etc. In this arrangement, the camera(s) 170 may be part of a presence sensor. The devices shown in FIGS. 1A-C are merely exemplary. For instance, the interactive applicant may be a smart speaker, which may not include a camera, and have LEDs instead of a display device.

Figure 2:
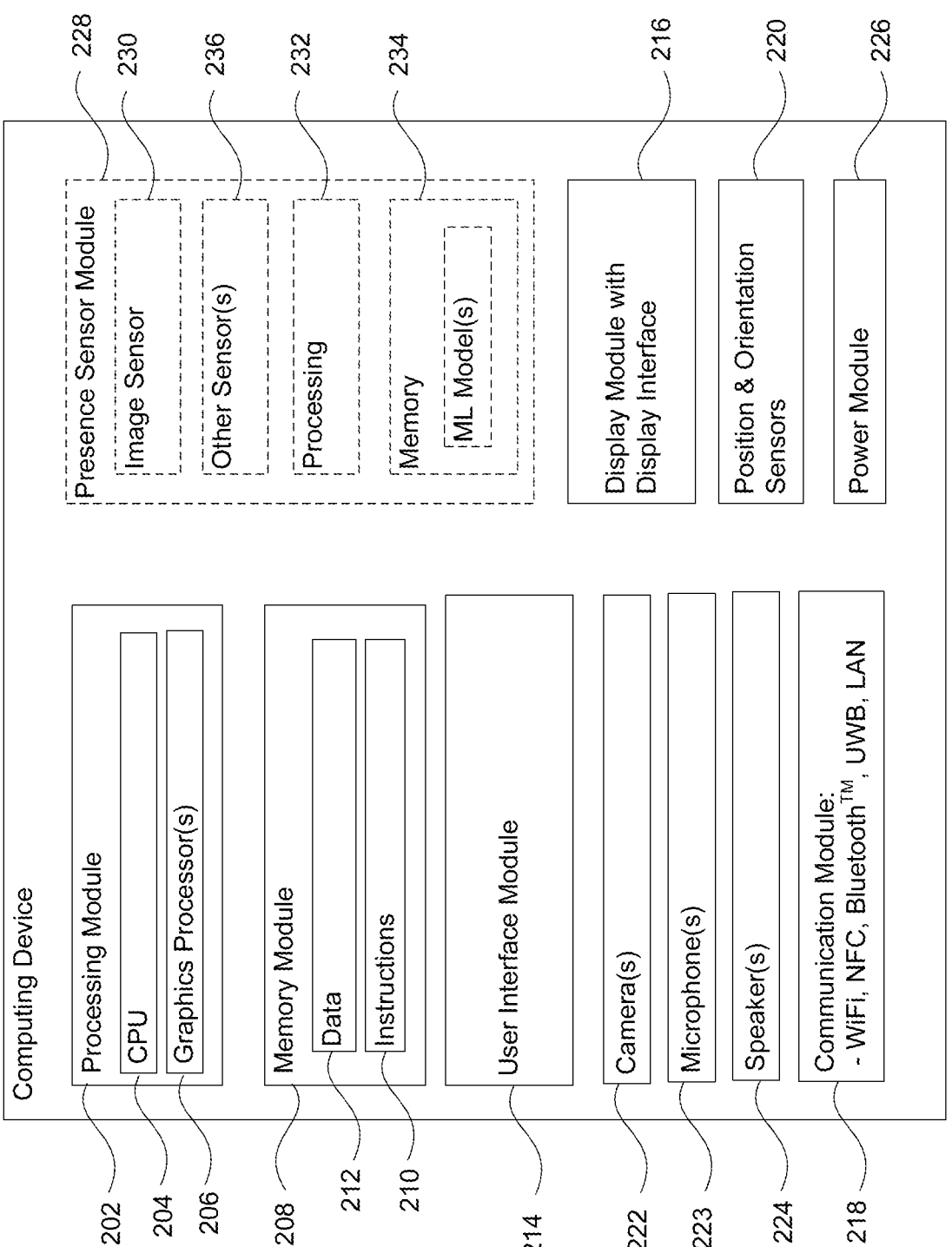
FIG. 2 illustrates a block diagram of an example computing device which can be employed in accordance with aspects of the technology.

FIG. 2 illustrates a block diagram 200 of an example computing device such as a desktop-type device, laptop-type device or interactive home appliance-type device discussed above. As shown, the computing device includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 via the user interface module. The display module 216 has a display interface and may be configured as a touchscreen that enables user input via a stylus or other tool, or by the user physically touching the screen. Alternatively or additionally, contactless gesture input and/or audio input may be supported.

User interface module 214 is configured to receive user input. User interface module 214 may receive commands from a user via user inputs and convert them for submission to a given processor. The user interface module may link to a web browser (not shown). The user inputs may include a touchscreen as noted above, in addition to or alternatively from a keyboard, keypad, mousepad and/or touchpad, microphone, gesture-based input or other types of input devices. The keyboard, keypad, mousepad and/or touchpad may be part of or connectable to the computing device via a cable or other wired connection, or may physically separate from the integrated client device and configured to connect via one or more wireless connections such as Bluetooth™, WiFi, ultra-wideband (UWB), infrared, etc. The user interface module 214 can be operatively connected to the display module 216.

The display module 216 may comprise circuitry for driving the display device to present graphical and other information to the user. In other words, the display device is configured to present visual content. By way of example, the graphical information may be generated by the graphics processor(s) 206, while the central processing unit (CPU) 204 manages overall operation of the computing device. The graphical information may display responses to user queries on the display module 216. For instance, the processing module may run a browser application, gaming application, enterprise app or other service using instructions and data stored in memory module 208, and present information to the user via the display module 216. The memory module 208 may include a database or other storage for browser information, game state information, location information, etc.

Memory module 208 can be implemented as one or more of a computer-readable medium or media, a volatile memory unit or units, or a non-volatile memory unit or units. The memory module 208 may include, for example, unmanaged flash memory and/or NVRAM (which may be NAND-based memory), and may be embodied as a hard-drive or memory card such as an embedded multimedia card (eMMC) or solid state drive (SSD) card (e.g., "managed NAND" or "managed memory"). Alternatively, the memory module 208 may also include removable media (e.g., DVD, CD-ROM or USB thumb drive). According to one aspect, the memory module 208 may be configured to have multiple partitions.

One or more regions of the memory module 208 may be write-capable while other regions may comprise read-only (or otherwise write-protected) memories. In one implementation, a computer program product is tangibly embodied in an information carrier. Although FIG. 2 functionally illustrates the processor(s), memory module, and other elements of integrated client device as being within the same overall block, such components may or may not be stored within the same physical housing. For example, some or all of the instructions and data may be stored on an information carrier that is a removable storage medium connectable to the base or the display housing (e.g., optical drive, high-density tape drive or USB drive) and others stored within a read-only computer chip which is integrated into the base or the display housing.

The data 212 may be retrieved, stored or modified by the processors in accordance with the instructions 210. For instance, the data may be stored in computing device registers, in a relational database as a table having a plurality of different fields and records, XML documents or flat files. The data may also be formatted in any computing device-readable format. The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in example 200 of FIG. 2, the computing device includes a communication module 218 for communicating with other devices and systems, including other computing devices (e.g., a user's mobile phone or wearable computing device), servers and databases. The communication module 218 includes a wireless transceiver: alternatively, the module may alternatively or additionally include a wired transceiver. The computing device may communicate with other remote devices via the communication module 218 using various configurations and protocols, including short range communication protocols such as near-field communication (NFC), Bluetooth™, Bluetooth™ Low Energy (BLE), UWB or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the example device as shown includes one or more position and orientation sensors 220. The position and orientation sensors 220 are configured to determine the position and orientation of one or more parts of the computing device, such as the display module relative to the base. For example, these components may include a GPS receiver to estimate the integrated client device's latitude, longitude and/or altitude, as well as an accelerometer, gyroscope or another direction/speed detection device such as an inertial measurement unit (IMU) capable of determining the orientation of the display housing relative to the base (as well as the rate of change of the positioning of the display housing).

The computing device may also include one or more camera(s) 222 for capturing still images and recording video streams such as an integrated webcam and/or a dedicated imaging device for presence sensing as discussed above. The device may also include one or more microphones 223 (which can be used for instruction input and/or presence sensing, e.g., by detecting acoustic information within the threshold distance from the client device), speakers 224, as well as a power module 226. Actuators to provide tactile feedback or other information to the user may be incorporated into the touchscreen of the display module (not shown).

In one scenario (as shown by the dashed lines in FIG. 2) the computing device may be configured to perform presence sensing of one or more people within a threshold distance (e.g., within 1-5 meters of the device). This may be done using an integrated dedicated camara, or, in some configurations the device may include a separate presence sensor module 228. As shown, this module includes an image sensor 230, a processing module 232 and a memory module 234. In one example, the image sensor can a dedicated low-resolution camera that may provide greyscale or color (e.g., RGB) imagery that has a size (in pixels) of 320×240, 300×300 or similar size (e.g., +/−20%). During operation, imagery may be taken by the image sensor 230 (or the webcam) once every 2-10 seconds (or more or less). The presence sensor module can be configured to implement one or more machine learning (ML) models to detect the presence of the one or more people in imagery taken by the image sensor 230. The processing module may comprise an FPGA or other processing device capable of processing imagery received from the image sensor in real time using one or more ML models. The models themselves can be stored in the memory module 234 or the main memory 208 of the device 200.

Figure 3:
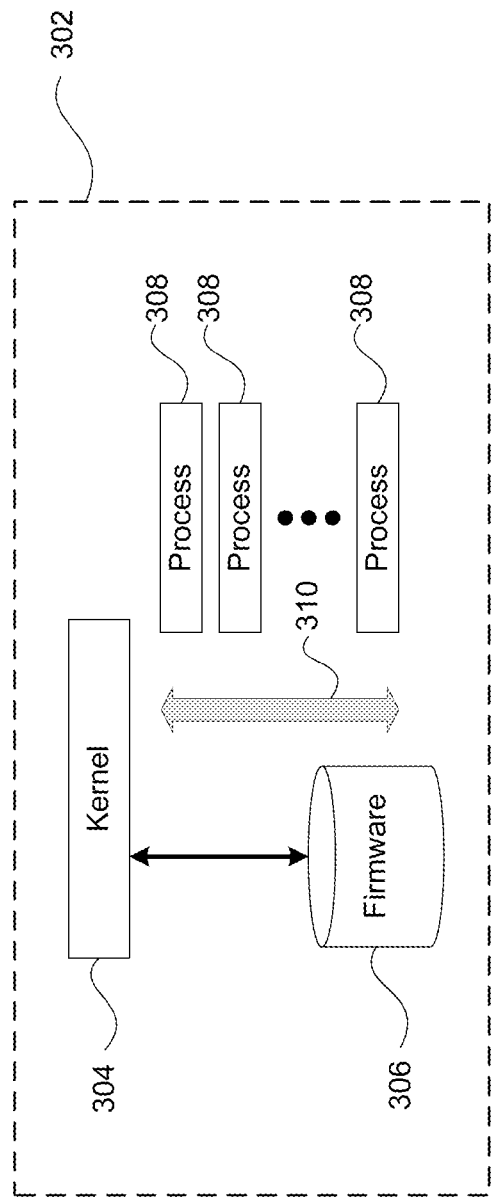
FIG. 3 illustrates a functional diagram of an operating system in accordance with aspects of the technology.

FIG. 3 illustrates a functional example 300 of an operating system 302 that may be employed by a computing device. The host operating system 302 may logically include, as shown, a kernel 304, firmware 306 and one or more routines or other processes 308. The kernel 308 may communicate with the routines or other processes via a system bus 310, such as a d-bus, for inter-process communication (IPC). This typically occurs through "syscalls". Here, the process calls into the kernel, and either gets an immediate response, or waits until the kernel responds to them, both of which occur by returning from the syscall.

In some instances, there can be a technical benefit to replacing the operating system with a different operating system. For example, patches or other updates may be applied to an originally installed operating system to provide new features or fix bugs. However, supporting many devices in one product line that may have different operating systems can increase complexity and delay feature development while trying to ensure support for those operating systems. In such situations, changing the operating system so that all devices have the same operating system can enable the manufacturer to provide consistent support across the entire product line.

Example Approaches

Figure 4:
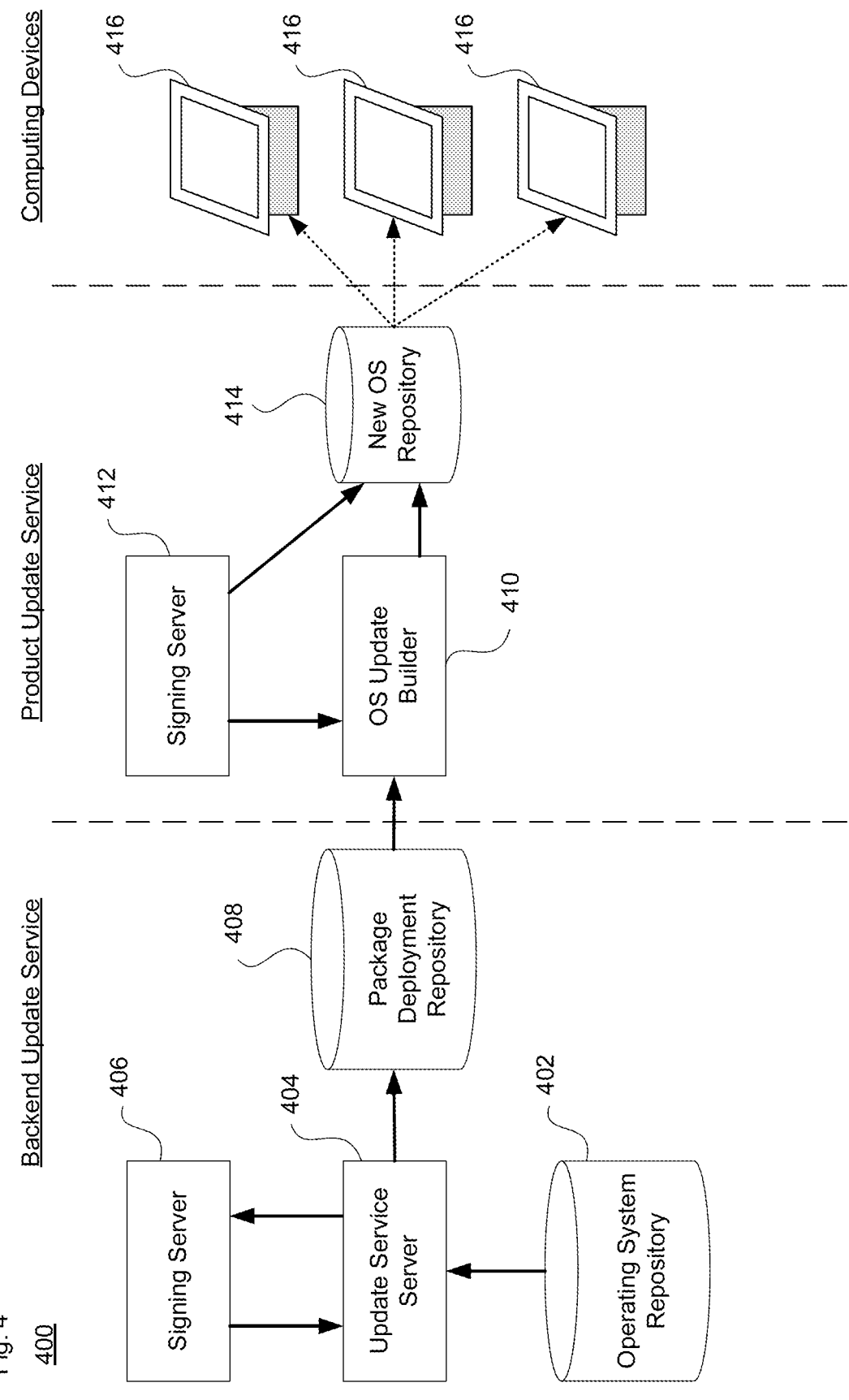
FIG. 4 illustrates an example of an over the air update system for use with aspects of the technology.

FIG. 4 illustrates an example system 400 for replacing the operating system of a set of computing devices via an OTA process. This example shows a backup update service section, a product update service section and a computing devices section. The product update service can include a package update server (not shown), which provides updates to one or more types of products. As shown, operating system repository 402 is configured to store one or more operating system images. These operating system images may be considered "base" images, in which the images at this point are tailored for a product and contain configuration data for that product. Update service server 404 is configured to manage products, builds and updates. This can include storing product configurations and logs such as audit histories. The update service server 404 receives operating system images from the operating system repository server 402. The update service server 404 is also configured to send information associated with the operating system images to signing server 406. The signing server 406 is configured to generate a product signing key for each operating system image and return signed metadata to the update service server 404. Upon receipt of the signed metadata, the update service server 404 is configured to form an update package including this information plus a base operating system image based on a signing key. A key may be issued for each product, which is then used to sign operating system images. By way of example, the update package may include a bootloader in addition to the base operating system image. The update service server 404 may include some configuration data that changes the update source (e.g., an application identifier, channel, etc.) for the product. This way the devices being migrated to the new OS are directed to the correct location to obtain corresponding update data. The update package is stored in package deployment repository 408.

When requested by the product update service, an update package is sent from the package deployment repository to an OS update builder 410. Here, the OS update builder 410 can create a build which may contain one or more config files associated with a particular product (e.g., a specific laptop model or an at-home assistant device) that are overlaid on top of the base OS image. The OS update builder 410 is configured to send the build to signing server 412. The signing server 412 is configured to validate the update package of the build and to generate a signature for the update package using the per-product signing key. This information is stored in new OS repository 414, and will be sent to computing devices 416 via an OTA transmission in order to replace the current operating system of each computing device 416 with a new operating system tailored to those devices. In one scenario, the devices to be updated may first connect to the old repository (e.g., OS repository 402) to download a hybrid OS (e.g., an airlock update or an OS migration build) that includes information for migrating to the new OS. Here, once some amount of on-device conversion has been done, the devices are now pointed to the new OS repository (e.g., new OS repository 414) to finalize the migration.

When addressing the technical problems of conducting OTA replacement of the operating system for many computing devices in the field, there are a number of factors to consider. This includes making sure that user data persists: in other words, the operating system change should not cause the loss or corruption of user data. Other factors are to keep the setup time to a minimum level to reduce device downtime, and make the changeover transparent to the user. In addition, the OTA process should handle all major update scenarios. In addition, the migration should be resistant to power failures and should be able to handle different failure/fault conditions to avoid the device from becoming bricked.

Figures 5A, 5B:
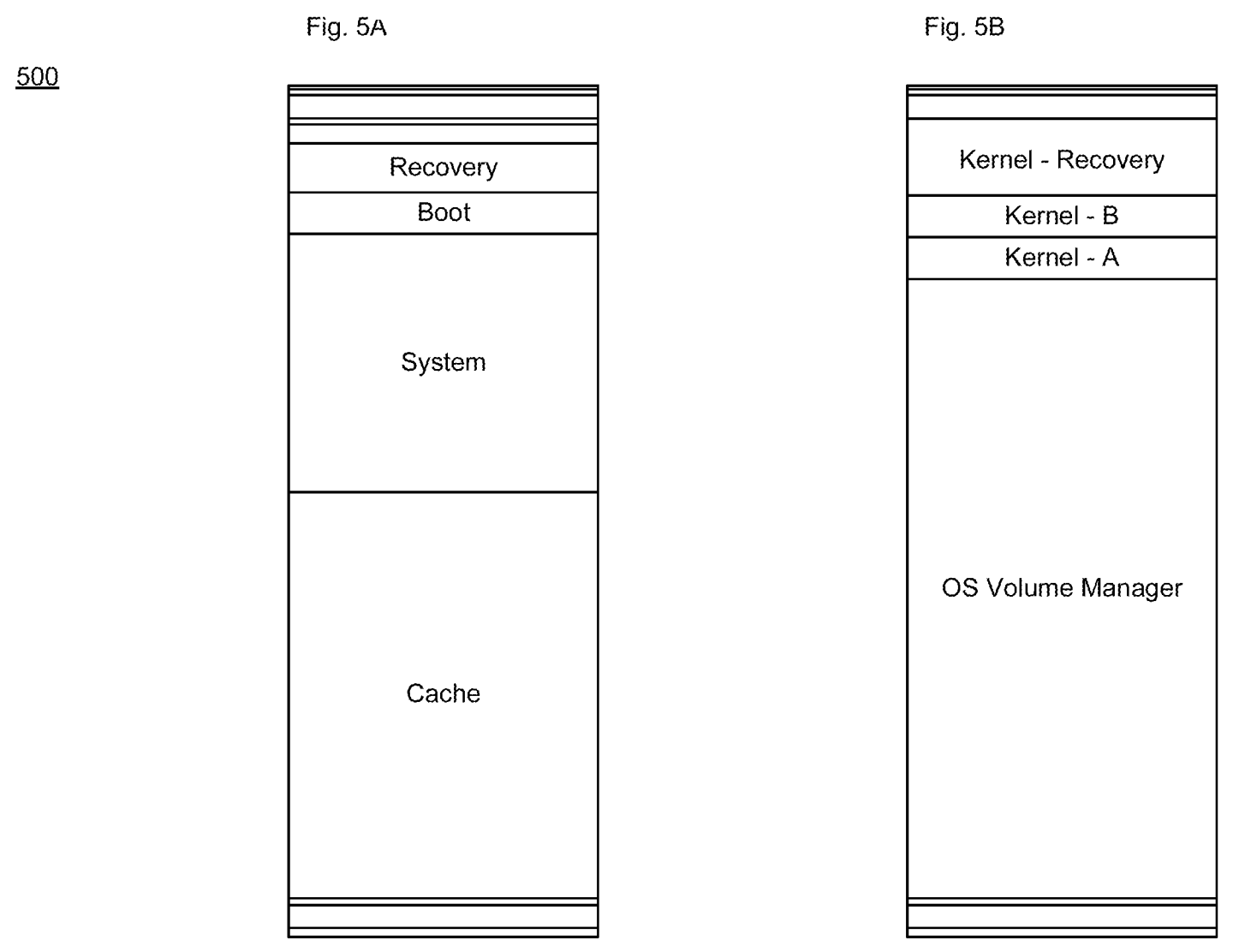

One threshold issue is to ensure that the computing device has enough disk space to hold new OS images during migration, since some of all of the components of the existing OS may be replaced by the new OS components. Another threshold issue is that the computing device can run a bootloader that is capable of booting the new OS kernel and can map memory partitions in a way that the new OS kernel can manage. FIGS. 5A-B illustrate an example 500 showing disk space and partitions for a current OS and for a new OS, respectively. As shown in FIG. 5A, the current OS partitions may include recovery, boot, system and cache partitions of varying memory sizes. And as shown in FIG. 5B, the new OS partitions may include a volume manager (VM), a recovery system kernel, and "A" and "B" copies of the system kernel. The volume manager is configured to store components, system configurations, and mutable data (e.g., user data). The mutable data partition can be encrypted using a key that is sourced from secure storage on the device itself.

As will be discussed further herein, the type(s) of memory used by the computing device may affect how the OS migration process is performed.

Figure 6:
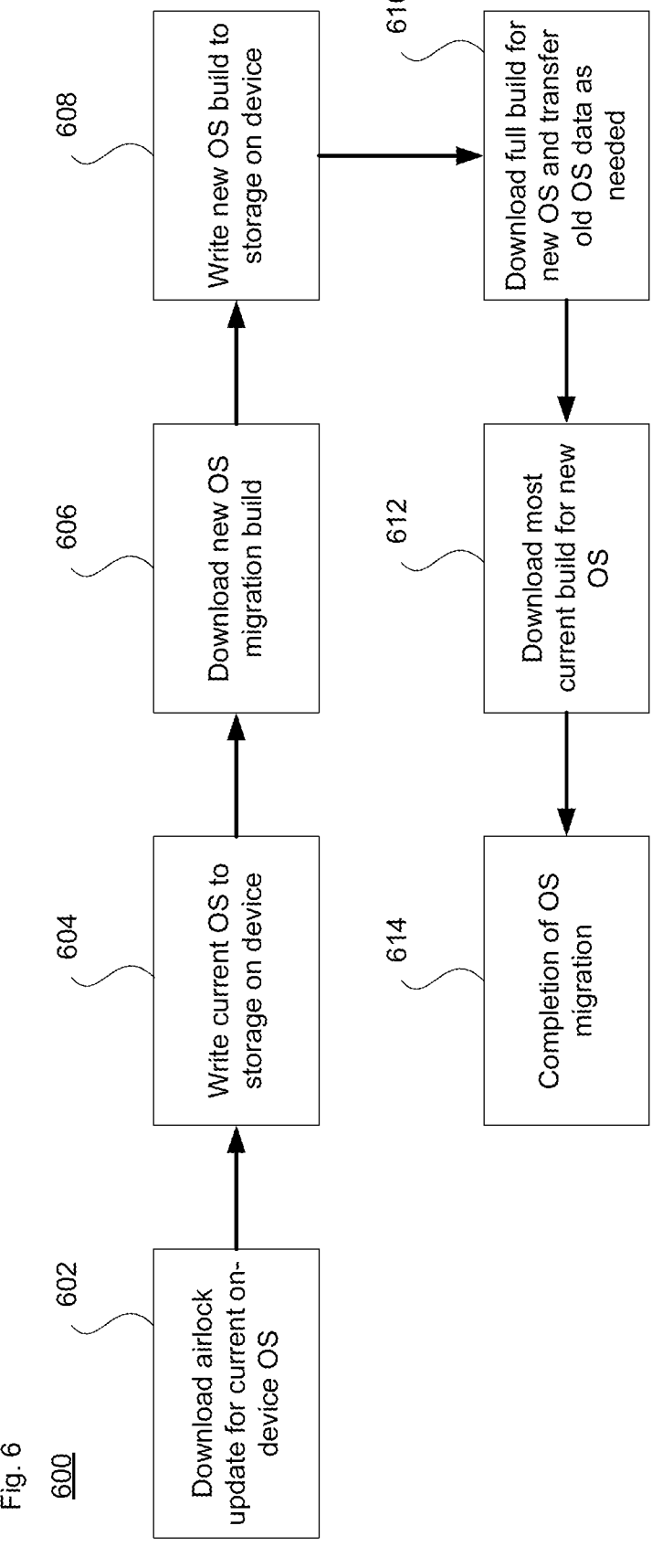
FIG. 6 illustrates an example operating system migration in accordance with aspects of the technology.

FIG. 6 illustrates one example 600 of how the OS replacement process may be performed on many computing devices such as for a particular product line. There may be tens of thousands, hundreds of thousands or even millions of computing devices in the product line. In certain cases, it may not be feasible to update all of the devices of the product line at the same time, and so the process may be broken out so that one subset (tranche) of devices is converted before moving on to the next subset. Furthermore, as each computing device migrates to the new OS, the backend system (e.g., the backend update service and/or the product update service) may encounter a disconnect when tracking the migration. This can occur because information about a given device (e.g., a unique identifier) may be associated with its operating system. Thus, when the operating system is switched from a first OS to a second OS, the backend system may not recognize the device. Should this happen, one result would be that the backend system may fail to track the progress of the rollout. Another result may be that there may be issues properly associating registration of the device with the new OS.

One way to avoid the disconnect situation in a fractional OS rollout despite all computing devices in a tranche using the same update channel is by applying an "airlock" build prior to the OS migration. The airlock introduces a new interim build very similar or identical to the original OS build the fleet (before migration) is currently running. Given that this new build is of the first OS, the existing fractional rollout mechanisms can update a fraction of the devices (tranche) to this interim build while keeping the rest of the fleet on the new OS. Then, only devices running the new interim build (those included in the tranche, and only them) will be migrated to the new OS. This way the system harnesses the existing (original OS) fractional rollout mechanisms to update then migrate the tranche. The airlock process essentially freezes the build for the current onboard OS, enabling the system to track device migration to a new OS. As shown in block 602, an airlock update is first downloaded to the computing device. For example, this update can be a build having a fractional rollout applied to it such that those devices running the last release of the onboard OS will be "seen" by or otherwise visible to the backend system. At this point, the current (first) OS is written to storage on the device at block 604. Once the airlock build has been rolled out to a selected percentage of devices, the devices in the airlock are allowed to migrate to the new (second) OS, and at block 606 the new OS migration build is OTA downloaded to the device. This package includes device images with files to be written to the device, which include kernel image for the new OS, a new OS volume manager, as well as host tools to handle user data and writing the volume manager. This package also includes update binaries with one or more programs to perform update operations, as well as metadata about the update (e.g., version number, build name, etc.) to be used during bootup. At block 608 the new OS build is written to storage on the device.

At this point, the device may reboot into a recovery mode for the first OS to apply the migration update. Recovery mode is a mode in which system-level operations are performed including factory resets and device updates. For example, the partition table can have a flag set for a boot-recovery mode, and upon reboot the bootloader reads this flag and selects to reboot from the recovery partition (see FIG. 5A). Next, a recovery program runs an update binary, which is a routine that applies the new OS images to the system to obtain the partition configuration shown in FIG. 5B. Once this is done, the device can reboot into the new (second) OS. In one scenario, where disk space is limited, update actions cannot occur during the migration update as there is not enough space on disk to write the entirety of the migration build. Here, all update actions would take place in recovery mode. Thus, as discussed further below; the migration to the most current version of the new OS via a staged migration. In this case, the migration build downloaded at block 606 may contain most, but not all, of the packages necessary to have the most current version of the new OS.

Upon reboot, the new OS volume manager can be extended to cover the cache partition of the old (first) OS as part of a migration service. At this stage, the system can migrate user configuration data to the new OS volume manager. By way of example only, migration-specific actions can include one or more of unpacking user data from the migration partition, connecting to a WiFi access point, restoring previously paired Bluetooth devices (or other wirelessly connected devices), transferring device-level settings, transferring settings for certain applications such as an assistant application, etc. The migration can also include the device checking to see if there are any updates for the new OS and/or publishing the device's migration progress so that the backend system can properly track its status.

Figure 7A:
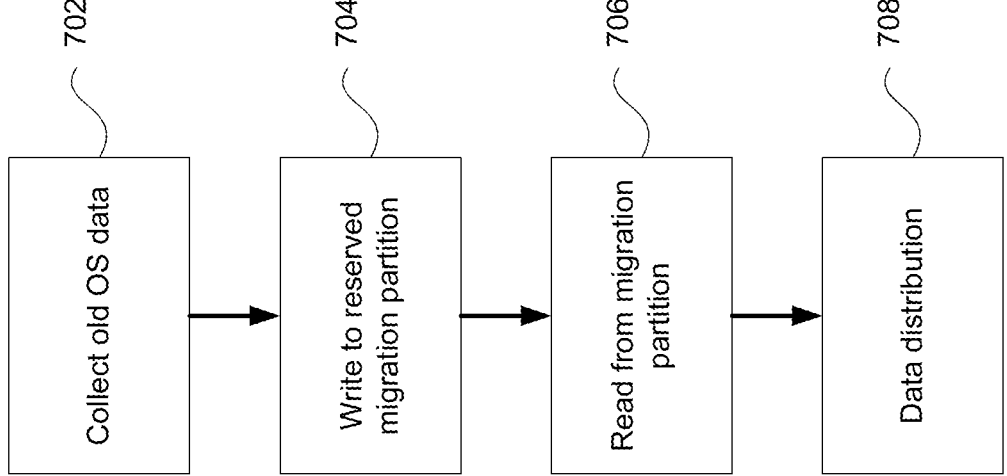
FIG. 7A-C illustrate data migration examples in accordance with aspects of the technology.
Figure 7B:
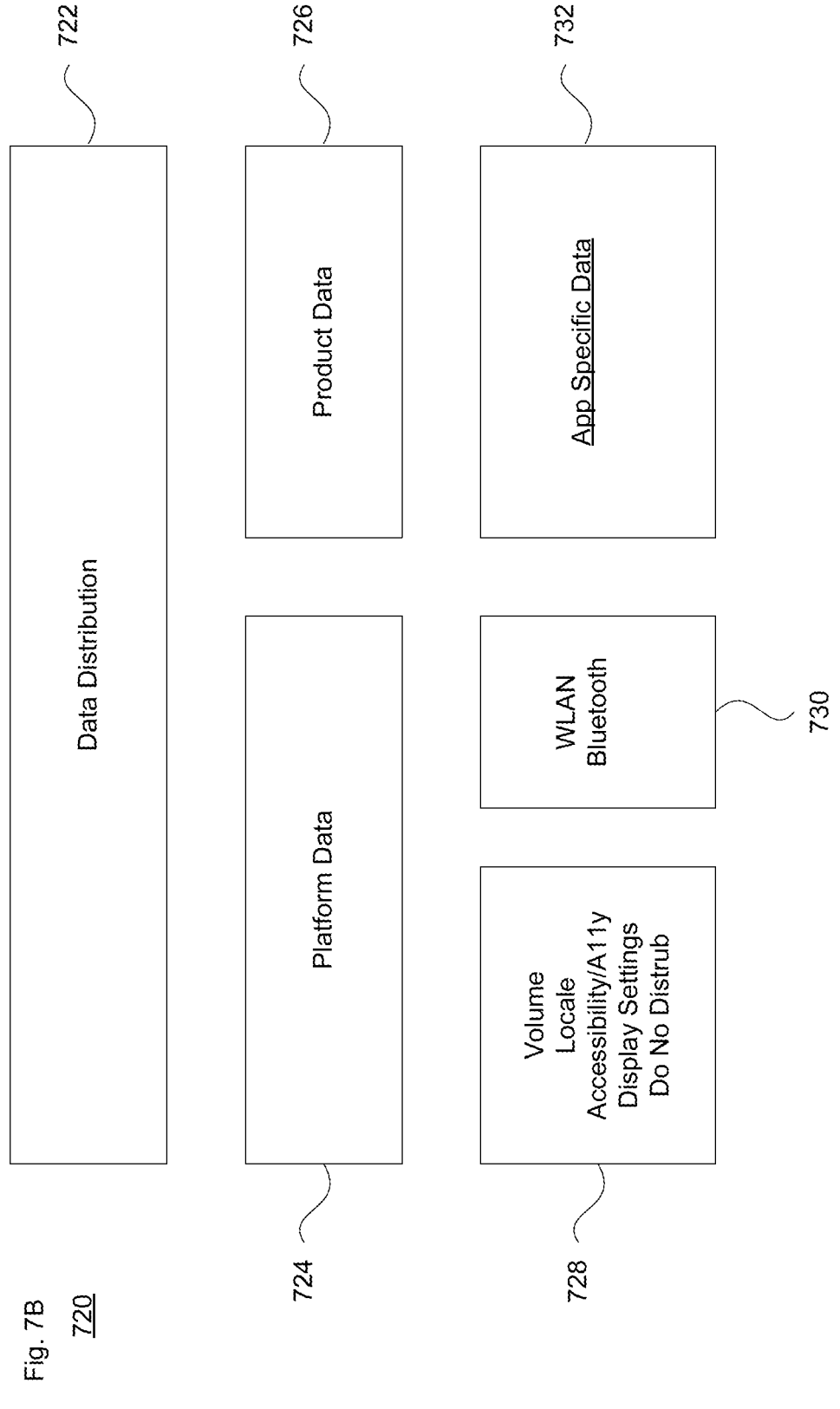

For user data migration, the process may occur as shown in example 700 of FIG. 7A, which is applied to migration processes that preserve user data. First, at block 702, a new OS kernel boot image is created by the old OS recovery process. At block 704 the old OS recovery process writes the new OS kernel boot image to the reserved migration partition. Then at block 706 the migration service/process reads the new OS kernel boot image from the migration partition, and at block 708 the migration service/process packs data into one or more interfaces in the new OS inter process communication (IPC) system for distribution from the migration partition to corresponding portions of memory associated with the new operating system boot image. This is done so that the data can be utilized by the new operating system. The data may be platform-related (e.g., specific to the hardware or a particular variation of the hardware) and/or product-related (e.g., corresponding to one or more applications to be run by the new operating system). FIG. 7B illustrates an example 720 showing that data distribution 722 encompasses product platform data 724 associated with the computing device and product data 726 associated with, e.g., applications to be run by the system. For instance, the product data can be associated with one or more application features for applications to be run on the new operating system. Here, the product platform data 724 may include a first set of APIs 728 that the migration service interacts with to set system-wide settings in the new OS for the computing device, and a second set of APIs 730 to bootstrap certain system-level components (e.g., WiFi and other connectivity features) for the computing device, while product data 726 includes application-specific data 732, which may include a set of APIs for exposing files wholesale to app-level components running in the new OS.

Figure 7C:
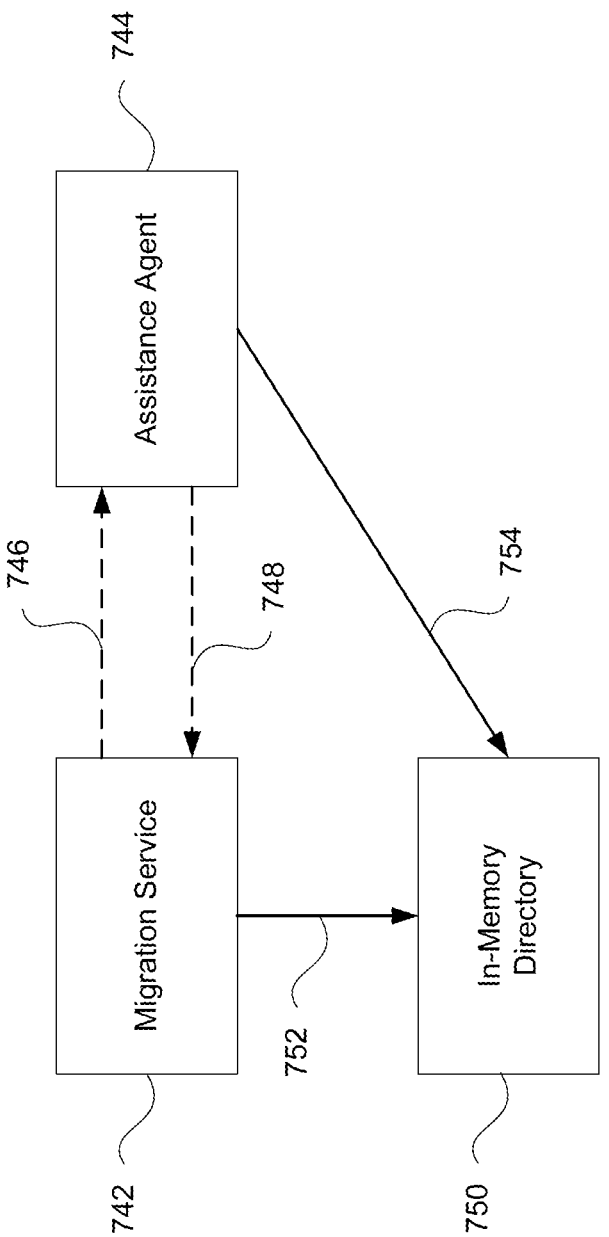

FIG. 7C illustrates an example 740 of user data migration for one component of application-specific data 732 (e.g., data for an assistance agent). The general process may include the migration service creating an in-memory directory. The migration service then copies files that were migrated from the old OS (or generated to facilitate a migration) into the in-memory directory. The migration service exposes this in-memory directory to other components (e.g., an assistance agent) by sending a directory handle via an IPC interface. The assistance agent uses the directory handle to open the directory, and reads and processes the data in the directory. The assistance agent then signals completion to the migration service. Thus, with respect to FIG. 7C, the migration service 742 places files in a directory 750 (e.g., in-memory directory) as shown by arrow 752. Here, migration service 742 sends a directory handle over an IPC interface to the application-specific block (e.g., assistance agent) 744 as shown by dashed arrow 746. The application-specific block 744 returns information to mark completion of the operation as shown by dashed arrow 748. And the directory 750 reads files from a directory handle associated with the application-specific block 744 as shown by arrow 754. The examples 720 and 740 of FIGS. 7B and 7C, respectively, apply to migration approaches that digest the user data and adhere to: (1) different handling of the various types of user data specific to a particular computing device (e.g., a smart display), and (2) limitations and data intake processes in order to support a high level of security.

In one scenario, once the user data migration is finished, the migration to the new OS is complete. However, in another scenario, the above provides migration to a base build of the new OS. This can be done to ensure that all devices being updated to the new OS start with the same initial version of that OS, and then any updates to the new OS can be made using another OTA update. One technical benefit to this approach is that because there may be onboard memory constraints, a change from the old OS to the current version of the new OS may not be possible, as the current version of the new OS may require more memory than is available while the old OS is resident on the device. Another technical benefit is that by locking one starting build and one ending build (here, a base build) the system can greatly simplify the test effort. For instance, the system would not need to test migration every time we deploy a newer build (OTA) of the new OS, which may be expensive from time and effort perspectives. This is because updating the base build to the latest new OS build is a simple OTA (which is not migration related) and thus tested as part of the OTA release process done irrespective of migration.

Thus, in the latter scenario, as shown at block 610 of FIG. 6, the device downloads a full build for the new OS. Updating from the base build to the full build can include updating the bootloader for the new OS, replacing the recovery partition for the old OS with the kernel recovery partition for the new OS, updating the B copy of the system kernel, and updating system configuration data with verified boot information for the B copy of the system kernel, which holds a key and descriptors needed during startup to verify the integrity of the OS image. Once this is done, the device is able to reboot into the full build of the new OS. In this scenario, at this point the migration to the new OS is complete.

In a further scenario, the full build may not include the latest updates to the new OS. Thus, the system may download the most current build for the new OS as shown in block 612 of FIG. 6. Updating from the full build to the latest build can include updating the bootloader for the new OS, updating the kernel recovery partition for the new OS, updating the A copy of the system kernel, and updating system configuration data with verified boot information for the A copy of the system kernel, which holds a key and descriptors needed during startup to verify the integrity of the OS image. Once this is done, the device is able to reboot into the most current build of the new OS. Then at block 614 the OS migration is complete. In one aspect, the partition itself may not be removed: however, the information in the partition would be overwritten with image bits for the new kernel.

Storage Considerations

Figure 8B:
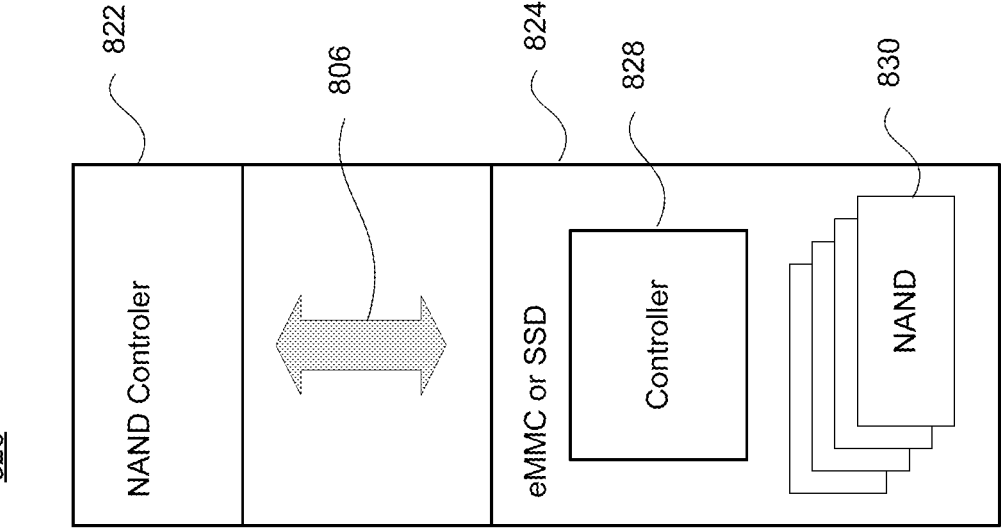
FIGS. 8A-B illustrate memory examples in accordance with aspects of the technology.
Figure 8A:
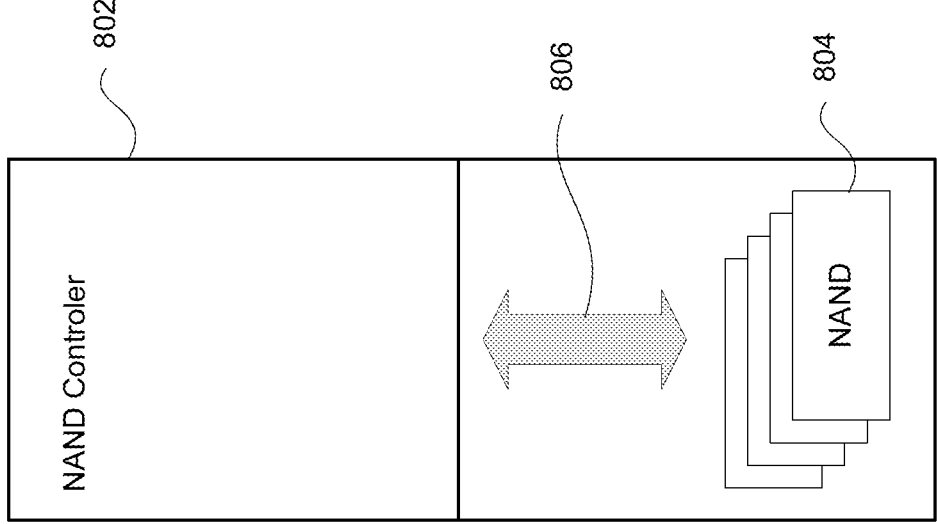

In addition to limited memory size, another factor that can affect how the OS migration process is performed is the specific type(s) of memory resident onboard the computing device. For instance, one model in a product line may use raw NAND flash memory, while other models in the product line may use eMMC or solid state drive (SSD) cards. FIG. 8A shows an example 800 of raw NAND, while FIG. 8B shows an example using eMMC or an SSD card. In the former case, a NAND controller 802 communicates with the NAND storage 804 via a NAND bus 806. In the latter case, NAND controller 822 communicates with the eMMC or SSD module 824 via bus 826. Within the eMMC or SSD module 824, controller 828 manages the NAND storage 830.

Using raw NAND as in example 800 may require certain considerations when migrating to the new OS. For instance, software-based flash management may be needed, such as to handle bad block management or wear leveling. The old OS and the new OS may perform this management differently. By way of example, the old OS may manage these considerations using universal base images (UBI), whereas with the new OS they may be handled via a flash translation library (FTL), which provides block management for low-level NAND devices. Here, the FTL format must be present on disk before booting into the new OS. Alternatively or in addition, a reliable error correcting code (ECC) should be employed to account for random bit flips, which can be handled by a storage controller. In contrast, when using eMMC or an SSD card, the NAND controller 822 handles these considerations, so the new OS does not need to address them.

Figure 9:
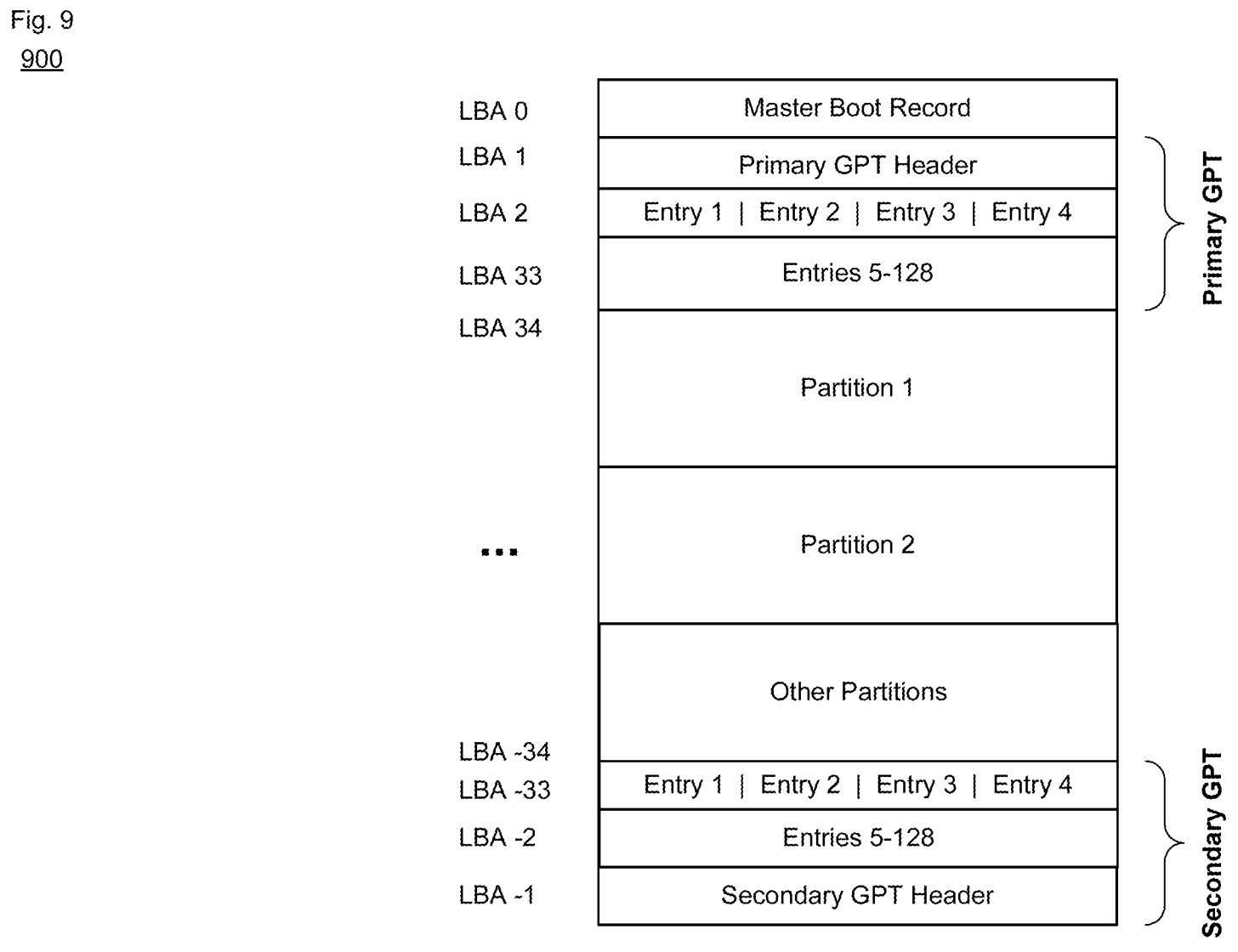

Furthermore, disk partitioning may need to be performed differently depending on the memory type. By way of example, for a computing device that uses raw NAND, partitioning may occur in the bootloader's device tree. In contrast, for eMMC or SSD card memory, a partition table may be written to the disk. FIG. 9 illustrates an example 900 of disk partitioning for eMMC or SSD card memory. In particular, this example shows an example globally unique identifiers (GUID) partition table (GPT) scheme. Each logical block may be, by way of example, 512 bytes in size and each entry may have 128 bytes. As shown in this figure corresponding partition entries may be located using logical block addressing (LBA) in LBA 2-33. In this example, negative LBA addresses are used to represent a position from the end of the volume, e.g., with –1 being the last addressable block.

The following is an example of OTA migration to a new OS when the device employs eMMC or an SSD card memory. FIG. 10A illustrates an example partition layout 1000 for the original (old) OS. This is a GPT-based partition table scheme, and includes the following partitions: boot ( ) (u-boot), boot1 (u-boot), Replay Protected Memory Block (RPMB), bootloader, reserved, env, fts, factory, recovery, boot, system, cache, fct, sys-config, migration, and buffer/limit. Here, boot0/boot1 provide storage for lower-level firmware which eventually executes the high-level boot-loader (u-boot). Replay Protected Memory Block (RPMB) is tamper-resistant, secure data storage, stores version info to prevent replay attacks or to block old builds from running on a device once it updates. Bootloader is storage for u-boot, the highest level bootloader which loads the boot/kernel image. Reserved means unused and set aside for future storage, while "env" has u-boot runtime environment data. "fts" has key-value data store for flash storage, factory data reset resistant. Used to store device lifetime metrics like activation date or number of FDRs. Factory is storage for data provisioned by the factory. This includes device-specific info like serial numbers, auth credentials, hardware calibration data, etc. recovery is a partition to store the recovery system which applies updates or resets a device to factory settings, while boot is storage for the kernel image and system is storage for system apps and data. Cache provides storage for mutable device data (user settings, cookies, tokens, etc.). Wiped during factory data resetting and the update to the new OS. "fct" is for the factory test system, which may be unused once device passes validation in the factory. "sys-config" may be unused in the original OS, and is provisioned ahead of time to prepare for future OS migration. Migration ma yalso be unused in the original OS, and is provisioned ahead of time to prepare for future OS migration. Finally, "buffer/limit" is padding for alignment and to handle eMMC memory sizes from different vendors. According to one scenario, an ext4 file system is employed in most partitions, with these exceptions: fts (a key-value store, used to communicate to the bootloader), sys-config (which is reserved for new OS verified boot metadata), and migration (which is reserved for user data to be transferred to the new OS from the old OS). For proper migration, the bits on disk should line up properly before booting into the new OS for the first time. FIG. 10B illustrates an example partition mapping 1020 from the old OS to the new OS.

The computing device may employ one or more features including peripherals such as a camera (e.g., for human presence sensing) or a close range radar sensor (e.g., for gesture detection). With new peripherals, new calibration and device settings may be needed. This can be especially true for cameras which usually have per-device calibration/tuning to get the best image quality. By way of example, human presence sensing or face matching may include one or more machine learning modules. Other features can include block-based encryption (e.g., using Linux Unified Key Setup (LUKS) encryption), as well sleep tracking). In one scenario, these files may reside in the factory partition and will need to be surfaced in the new OS. The factory partition may also include MAC address information, digital rights management (DRM) keys, etc.).

One important aspect of the OS migration process is that in case of a power failure, the device must remain operational, with no loss of user data. Handling missing or corrupt data should not prevent migration. Also, preventing loss through redundancy is also beneficial on systems with unreliable storage mediums. Preferably, no user intervention would be required during the update process. In addition, it can be beneficial for the update process to be reversible, i.e., to revert back to the old OS. Thus, in this type of scenario, the recovery partition should always be operational and the cache partition should always be readable when the device can fall back into recovery mode (as the cache stores the OTA package and user data).

Figure 11A:
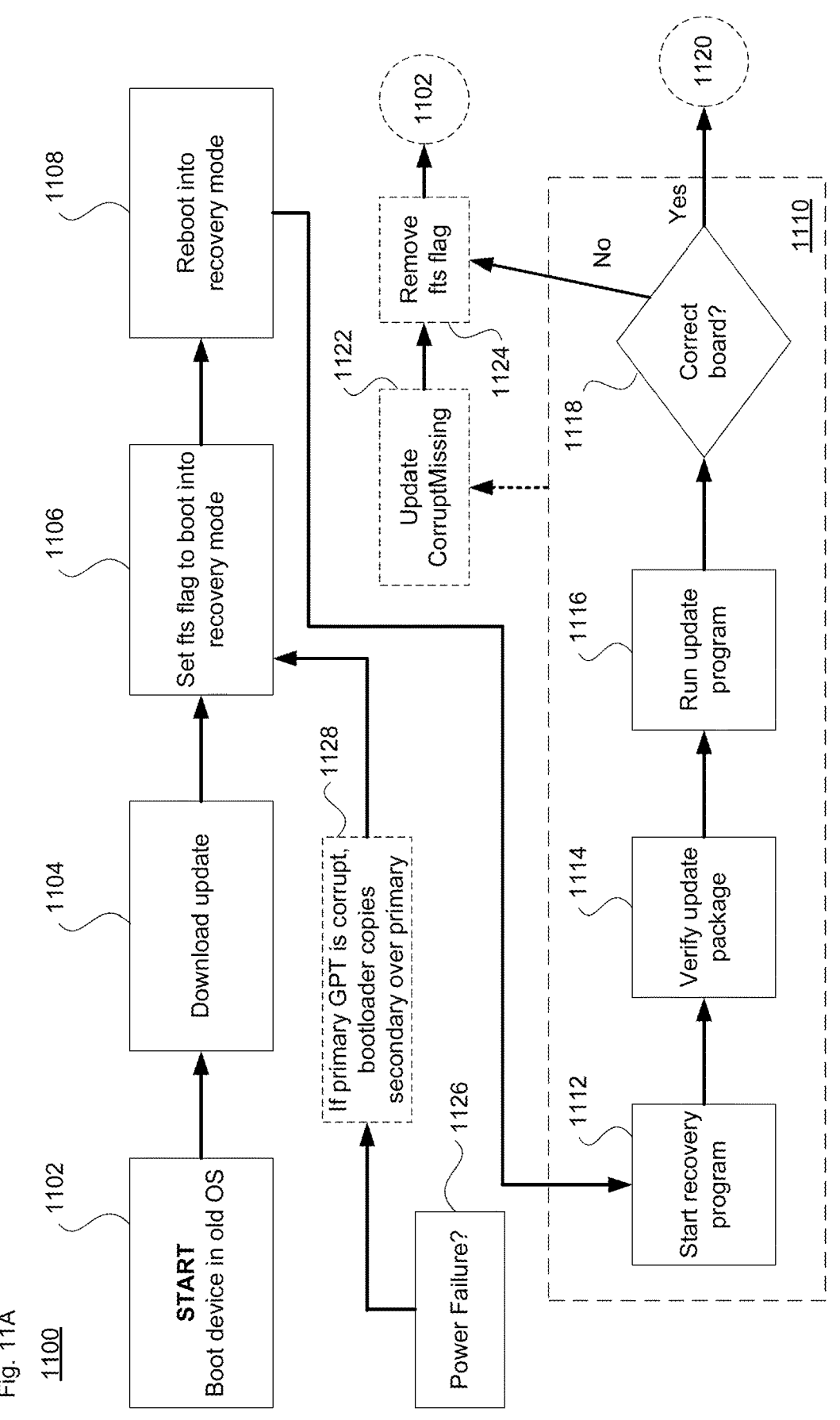
FIGS. 11A-C illustrate an example update process in accordance with aspects of the technology.
Figure 11B:
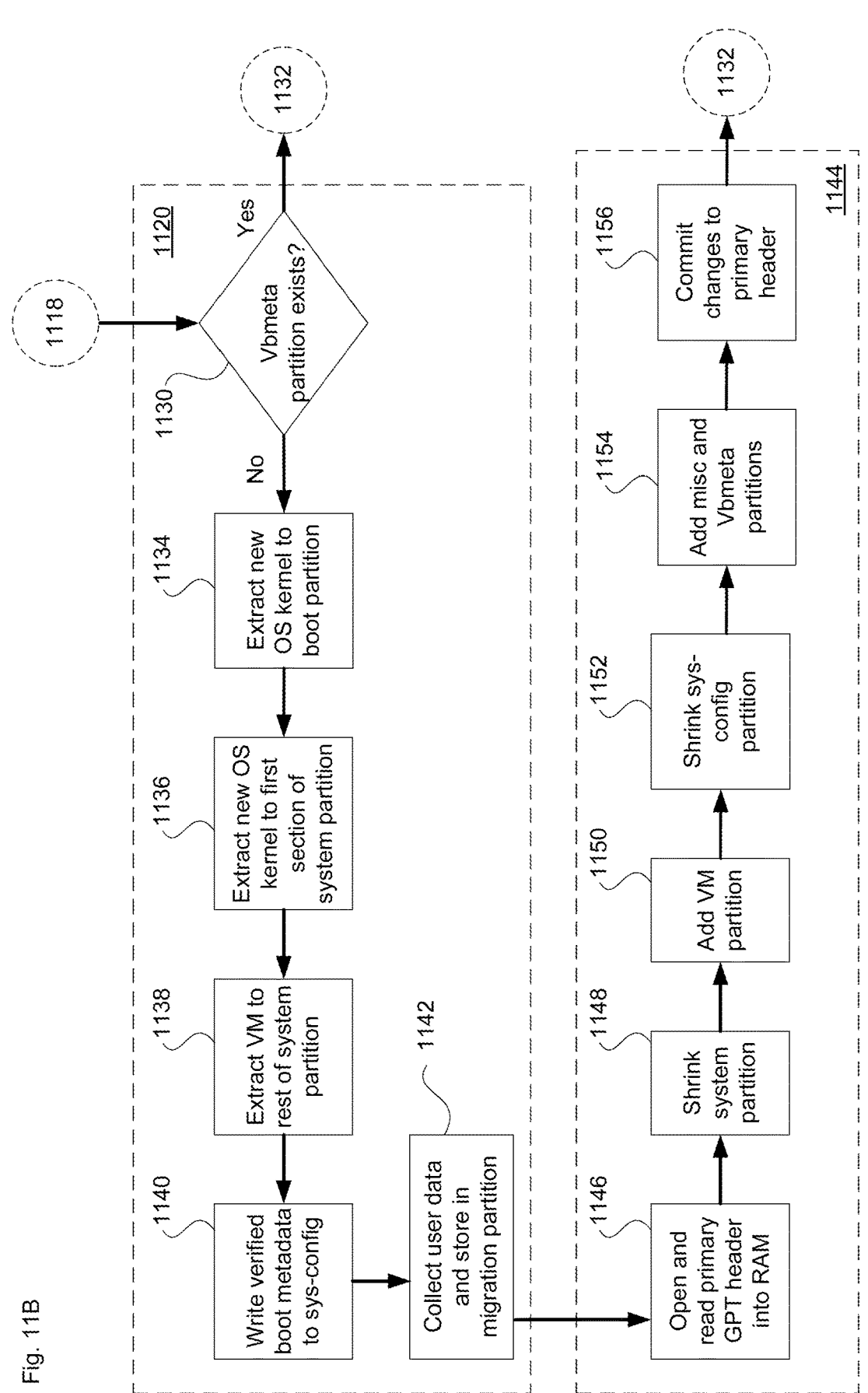
Figure 11C:
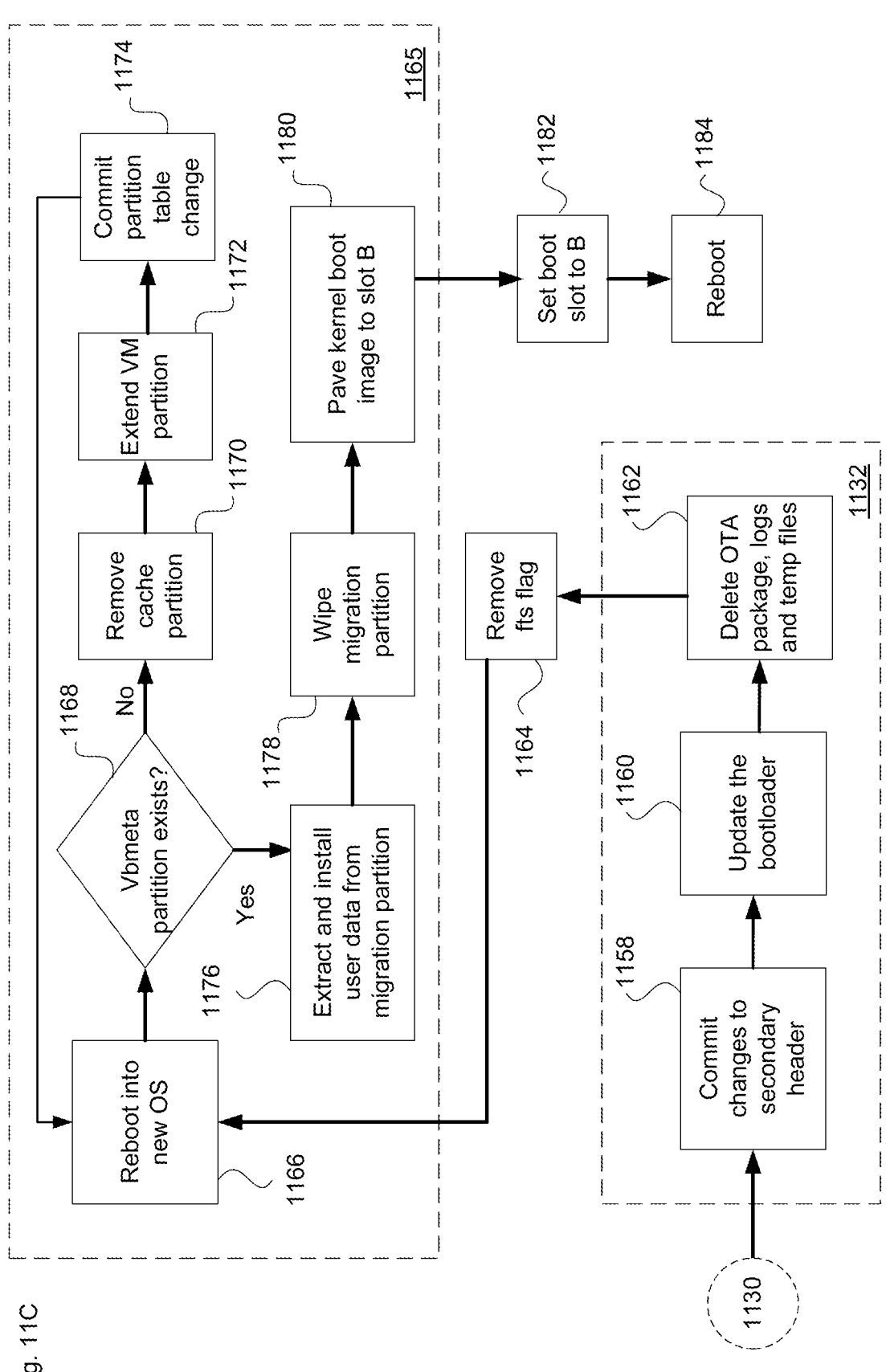

FIGS. 11A-C illustrate an example update approach 1100 when the device employs eMMC or an SSD card memory. At block 1102 the process starts by booting the device into the old OS. Then at block 1104 an OTA update is downloaded to the device. Here, the OTA package is stored in the cache partition. Then at block 1106 the device sets the fts flag to alert the bootloader to boot into the old OS recovery mode, and that recovery mode reboot is performed at block 1108. At this point, recovery and cache are protected from writes that can corrupt their contents and/or file systems.

Next, a pre-update route 1110 is performed. Here, upon rebooting in recovery mode, at block 1112 the system starts a recovery program, which reads OTA package contents from the cache partition, verifies the update package at block 1114 and runs an update program (e.g., a script) at block 1116. The update script writes the new OS kernel to the boot partition. The update script decompresses and writes the volume manager image to the remaining space of the system partition. The update script runs a program to write verified boot metadata to disk, and also runs a program to collect user data from the cache partition and write it to the migration partition. In addition, the update script may run one or more programs to update the GPT partition table. In one example, the bootloader can update the GPT when a copy of the new GPT is placed in the migration partition. In another example, a copy of the GPT is placed in the system image. When the new OS system boots for the first time (e.g., at block 608 of FIG. 6), it may update the GPT at that point. Note that according to one aspect of the technology, the update to the GPT partition table must be atomic, i.e., changes from the old OS partition table to the new OS table cannot be interrupted. If the update process is interrupted, the system would then fall back to the old OS partition table because the update process will need to restart from the beginning. The bootloader's GPT driver will handle this fallback so long as the system updates the primary header then the secondary header.

Next, at block 1118, the system checks to ensure the board is correct. If yes, the process moves to block 1120 (for writing binaries) in FIG. 11B. If no, then at block 1122 the system updates corrupt or missing data as needed, and at block 1124 removes the fts flag. Note that if there is a power failure (block 1126), the system will return to block 1106 to start the process to boot back into recovery mode. Here, as shown at block 1128, if the primary GPT partition table is corrupt, then the bootloader will copy the secondary GPT partition table over to the primary before setting the boot flag to boot into recovery mode.

At block 1120 of FIG. 11B, the system may check to see if a metadata partition (e.g., Vbmeta) exists. If so, the process will move to a finalization block shown in FIG. 11C (block 1132). If not (or if there is no check), then the process involves extracting the new OS kernel to the boot partition at block 1134, then extracting the new OS kernel to a first system of the system partition at block 1136. At block 1138, the volume manager is extracted to the rest of the system partition at block 1138 and verified boot metadata is written to the sys-config partition at block 1140. Next, user data is collected and stored in the migration partition at block 1142.

From here, the process continues with updating the GPT partition table at block 1144. In particular, at block 1146 the system opens and reads the primary GPT header into memory (RAM). Upon updating the GPT partition table, the system partition is shrunk at block 1148, and defines a volume manager partition in the remaining space at block 1150. Next, the system may split the sys-config into a number of distinct partitions for verified boot metadata, which can involve shrinking the sys-config partition itself at block 1152, adding miscellaneous (misc) and metadata (Vbmeta) partitions at block 1154. At block 1156, the system commits changes to the primary header. Then, turning to block 1132 of FIG. 11C, the next step occurs at block 1158, where changes are committed to the secondary header. At this point, the device can be rebooted into the initial version of the partition table for the new OS.

A next phase is to continue with finalization of the update, where the update script runs end-of-install procedures. This can include updating the bootloader at block 1160, deleting the OTA package from the cache partition, and deleting recovery/update log from the cache partition, temp files, etc., at block 1162. Next, at block 1164 the fts flag is removed (which would force the device to boot into recovery mode) before the process moves to block 1165. Here, at block 1166 the device is rebooted into the new OS by the recovery program. At this point, recovery and cache are free to be modified.

Next, a migration program runs and fixes the disk as needed. Upon determination at block 1168 that the metadata (Vbmeta) partition does not exist, then at block 1170 the migration program removes the cache partition, extends the volume manager partition at block 1172, and creates data partition inside volume manager (if needed) at block 1174 before rebooting again into the new OS (block 1166). Upon determination at block 1168 that the metadata partition does exist, on reboot the volume manager driver binds and resizes data structures. User data is extracted from the migration partition at block 1176, and user data is installed into components of the new OS via appropriate FIDL interfaces. By way of example, this can include user data associated with display brightness, speaker volume, WiFi, user assistance, etc. Next, at block 1180, the system paves the kernel boot image to slot B (this is part of the migration image). Then at block 1182 slot B is set as active. Then the migration partition is wiped and the device is rebooted at block 1184.

As discussed above regarding FIG. 6, this approach for FIGS. 11A-C may be done in phases to move from a base build to a full build. Here, the migration procedure involves writing a "stepping-stone" build to the disk while in the old OS recovery mode. In this case, the system may explicitly write the disk in an order that is robust against power failure, such as if the device loses power and restarts, the device will still be able to resume the update. This approach allows a device manufacturer to scale much more easily across all devices with the same (or similar) partition schemes. However, this approach may result in unwanted downtime for the time needed to "step" through the new OS migration, where the downtime may be constrained by the available Internet speed.

Given this, in another scenario the device may be updated to a full new OS build without going through the stepping stone process (e.g., blocks 610) and/or 612 of FIG. 6). For instance, the base build can be augmented to include selected binary large objects (blobs) for the new OS file system, including migration-specific blobs and then the system can perform a "local OTA" to run the desired build (e.g., a "merged" build). Here, on the first boot into the new OS, the device would run a process to migrate user data and set up the required components as if it was a dedicated migration "stepping stone" build (e.g., from a base build to a full build). During this scenario's migration process, only the components necessary for migration are available and running. These components are also run in a specific configuration that facilitates a migration. For example, an app may have the capability to pause and accept an external configuration if it is launched with a flag set in its configuration data.

For this scenario, the migration process involves setting up the device's WLAN access point, user assistance settings (e.g., alarms, timers, etc.), and device settings (volume, brightness, do not disturb, etc.). Once the settings are applied, the kernel boot image would be saved to disk. Once this process completes, the system's merkle root will have been updated to the merkle root of the new OS build. This will cause a change in the set of packages that run at boot time. This occurs by writing a new kernel boot image to disk and rebooting the device into it.

A further scenario can involve a hybrid migration, in which the device updates from the old OS by rebooting in recovery mode as described above and then rebooting into a new OS system recovery mode before rebooting into the fully migrated new OS. In this approach, instead of writing the kernel and volume manager bits to disk up front, a minimal OTA update is downloaded that only contains the new OS system recovery build. Because the new OS system recovery would need to be written to disk at the same time as the old OS recovery, the payload for the new OS system recovery would be written in a different place. The partition table would be updated to accommodate this.

The device would then boot into system recovery and rebuild the system from scratch. On the first boot into the new OS, the system will have to migrate user data again. This approach is advantageous because it can be applied consistently across current and future devices of the product line.

According to another aspect, the OS migration can take advantage of an A/B partition scheme. Here, the system can apply updates in the inactive slot while running instructions from the active slot. This reduces downtime and increases reliability of the device as it will always have a version of the system that is working. This format employs a different approach than those discussed above. Here, because of the lack of recovery mode in the old OS, the device jumps directly into the new OS after the update and is prepared to remap/edit the GPT while running some form of the new OS. Consistent with the other approaches, in the event of a power failure at any time, the device should be able to boot and continue the update process, thereby avoiding a bricked device under any circumstances (besides hardware failure). There should be no loss of user data, and no user intervention should be needed during the update process. In addition, the update process should be reversible with the same robustness as the above-discussed migration approaches.

The first condition states that the device must always be operational in the case of power failure. This requirement can be easily met by ensuring working new OS images are shipped in the OTA update. Because of the A/B scheme, the process will always be coming from a working old OS image and can revert back to the working old OS image in the case of failure to boot the new OS kernel. The second condition is no loss of user data. This is possible as the approach does not need to modify the data partition when booting the new OS for the first time. If the data partition is encrypted by LUKS using an AES cipher in XTS mode, the process may also include decrypting this data and storing it in a separate location where it can also be encrypted at rest.

The third condition is no user intervention required during the update process. This can be facilitated by new OS components exposing APIs to allow for inserting user data into their data directories. As long as certain configuration data (e.g., WLAN configuration data) is transferred as part of the migration, the user should not need to set up their device again. In addition, credentials in the factory partition would also be preserved. This would involve reading the data in the factory partition.

Figure 12A:
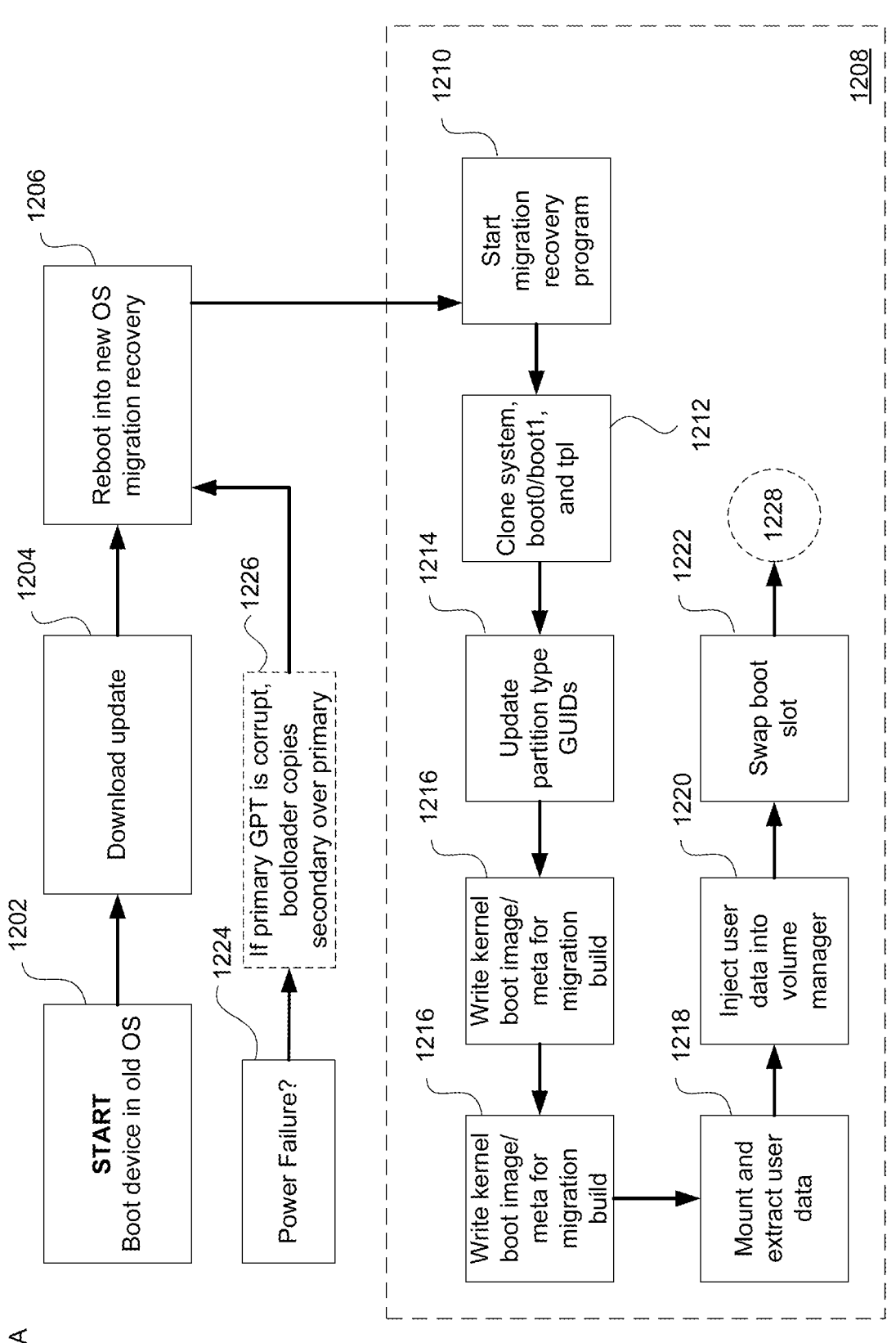
FIGS. 12A-B illustrate a process flow for another migration approach in accordance with aspects of the technology.
Figure 12B:
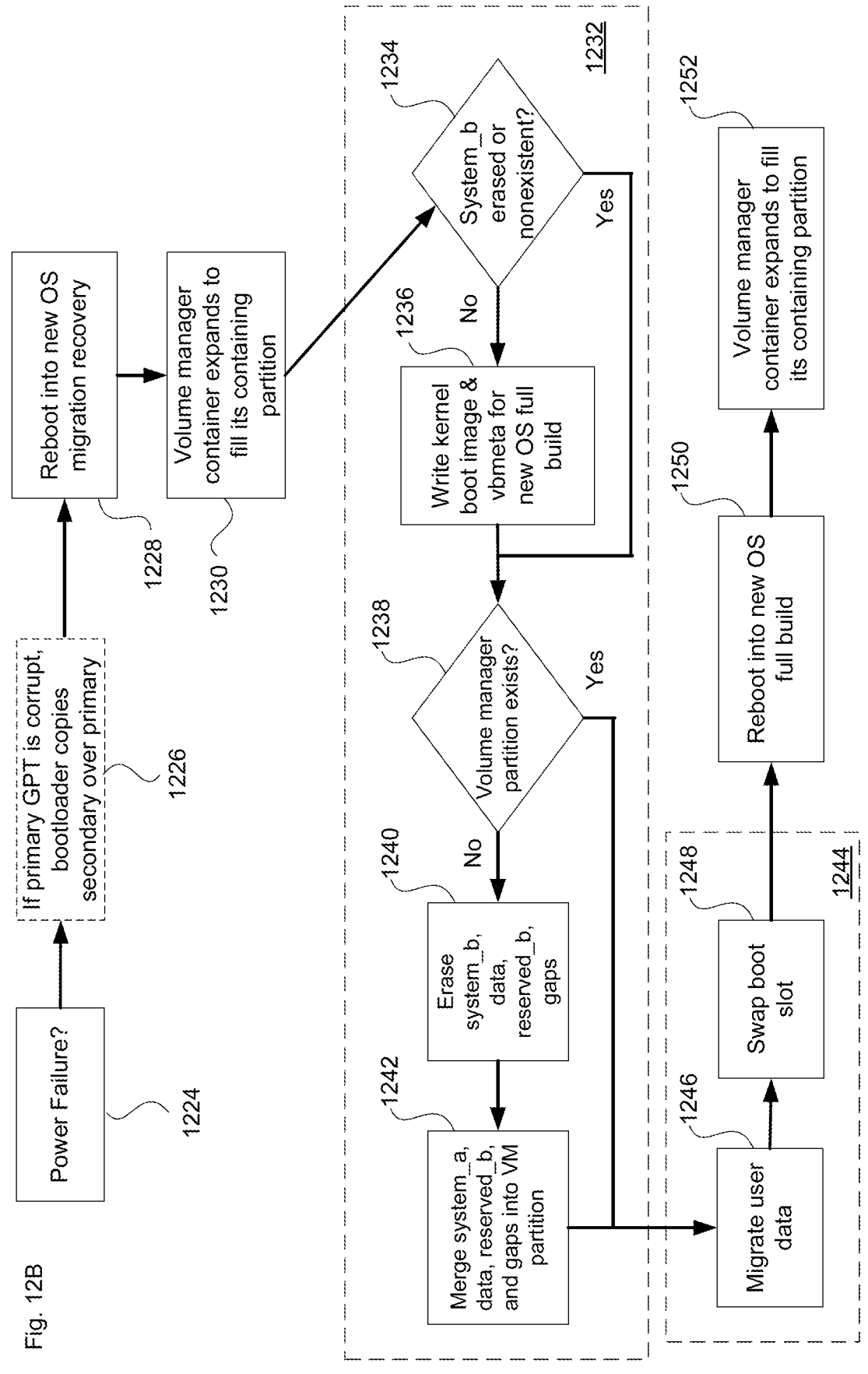

FIGS. 12A-B illustrate a process flow: 1200 for this migration scheme, in which an update engine on the device will download the payload directly into the relevant partitions. This approach includes a number of stages: old OS, new OS migration recovery, new OS migration, and implementation of the new OS. The process starts at block 1202 in the first stage by booting the device into the old OS. At block 1204, the old OA applies the new OS payload to disk, where an update engine downloads the OTA update. The update engine writes the new OS migration recovery kernel image into the inactive boot partition. The update engine also writes the system partition which contains a kernel boot image tool, an unsparse merged Volume Manager (VM) image+extra kernel boot image elements and their associated metadata (e.g., vbmeta) images needed to complete migration offline into the inactive system partition. After this partition is updated, it will be mounted by the update engine, and a script will be executed to extract user settings. The output file for those settings will still be unencrypted temporarily in a temp partition, but will be put inside an encrypted archive and then copied into the migration partition. The same key that is used for LUKS on the device can be used for this encryption. The update engine writes new OS-compatible bootloaders to inactive bootloader slots (e.g., tp1 and boot0)/boot1, which is not the partition which holds the kernel image). TPL is a third bootloader that is executed once it is verified by the lower-level bootloaders using secure keys. It is based on u-boot. It verifies the kernel and boots it. The update engine swaps the active slot to the one that was just updated with new OS images.

Then at block 1206 the device reboots into the new OS migration recovery mode. The process continues at block 1208. Within this block, at 1210 the process puts the disk into a predetermined layout to start the migration recovery program and extracts user data. At block 1212 the active system, boot0/boot1, and tp1 partitions are cloned into the inactive slots. New OS migration recovery replaces the contents of system_a with the volume manager chunk from system_b at block 1214, updating partition type GUIDs. Then at block 1216, the new OS migration recovery extracts and writes the kernel boot image and metadata (e.g., vbmeta) for the migration build. Next, at block 1218, the new OS migration recovery extracts and writes the kernel boot image and metadata for recovery. Then at block 1218 the new OS migration recovery decrypts and mounts the (user) data partition and extracts the migration data out of the data partition and injects it into the volume manager's (encrypted) data partition at block 1220. Then at block 1222 the new OS migration recovery swaps the active boot slot.

Similar to the earlier-described approaches, if there is a power failure (block 1224), the system will return to block 1206 to start the process to boot back into new OS recovery mode. Here, as shown at block 1226, if the primary GPT partition table is corrupt, then the bootloader will copy the secondary GPT partition table over to the primary before setting the boot flag to boot into recovery mode.

After swapping the boot slot at block 1222, the process continues at block 1228, which is shown in FIG. 12B. Here, the new OS migration recovery reboots the device. At block 1230, the process migrates the user data and sets the device's final partition table. The process then proceeds to block 1232. Here, at block 1234 it is checked to see if system_b has not been erased. If not, then at block 1236 the migration component extracts and writes the kernel boot image and vbmeta for the full build into the inactive slot. If so, then the process skips to block 1238, where it is determined whether the volume manager partition exists. If it does not exist, then at block 1240) system_b, data, reserved_b, and the space in-between them are erased, and then at block 1242 the migration component updates the partition table to merge system_a, system_b, data, reserved_b, and the space in-between them into the final full FVM partition. If the volume manager partition does exist (or the processes at block 1242 are completed), the process proceeds to block 1244 for data migration. Here, at block 1246 the migration component processes user data. Then at block 1248 the migration component swaps the active (boot) slot. Then at block 1250 the migration component reboots the device into the new OS full build. Finally, at block 1252 the volume manager is expanded to consume the new space made for it (e.g., the entire system_a partition).

Reversing the Migration

As noted above, it can be beneficial for the update process to be reversible, i.e., to revert back to the old OS. This is useful regardless of the specific update approach employed. Thus, according to one aspect, to get the old OS back onto the device, the following approach may be performed. The device takes an OTA "recovery-only forced update" to reboot into reverse migration recovery. Here, certain credentials (e.g., WiFi credentials) are mounted from stash. Encrypted WiFi credentials are stored in the migration partition as backup. Then the system connects to WiFi and downloads the old OS images (e.g., system, boot, bootloaders), writes the new OS images to the relevant partitions, cleans up the migration partition, and reboots the device into the old OS.

Example Network

Figure 13A:
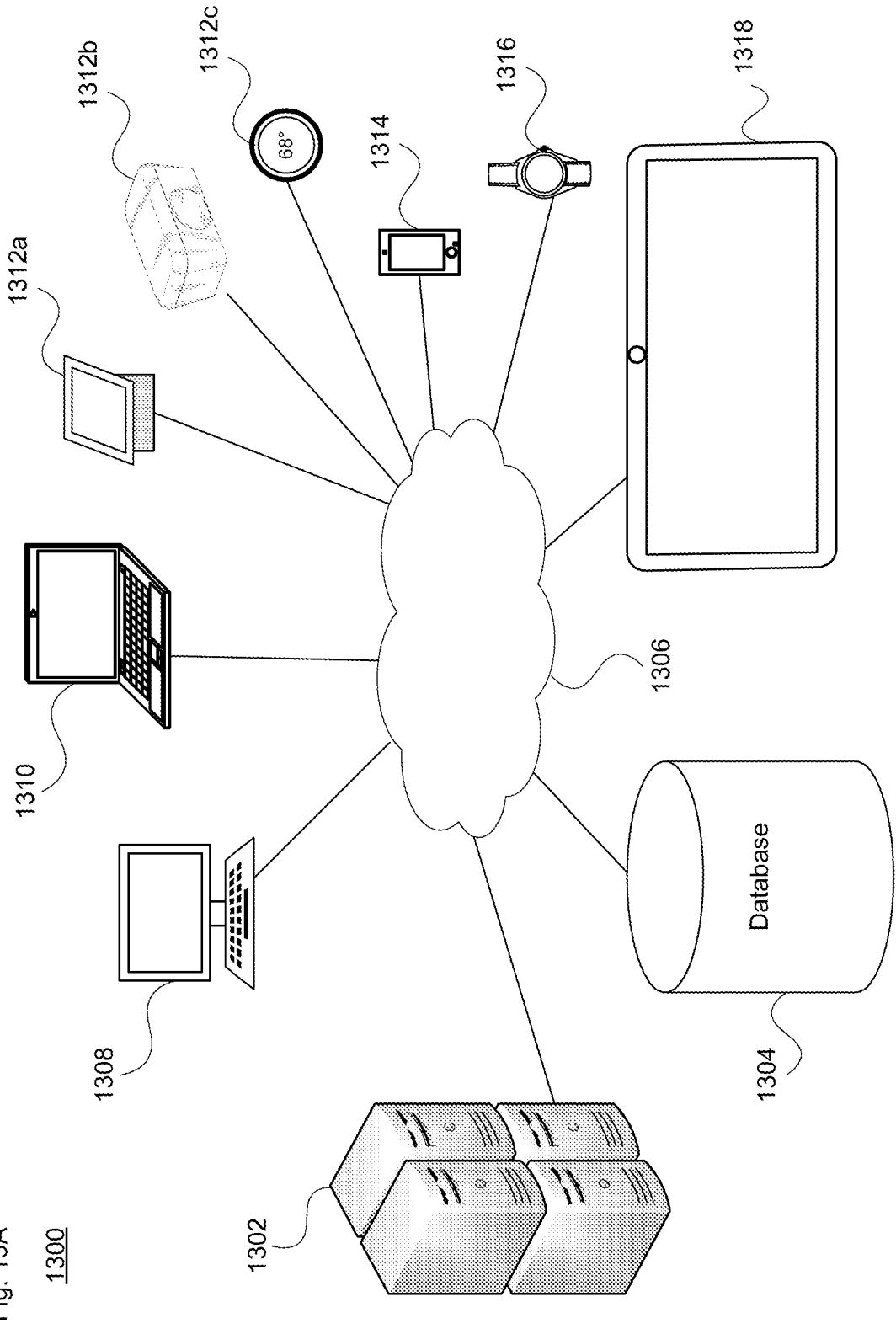
FIGS. 13A-B illustrate a system for use with aspects of the technology.
Figure 13B:
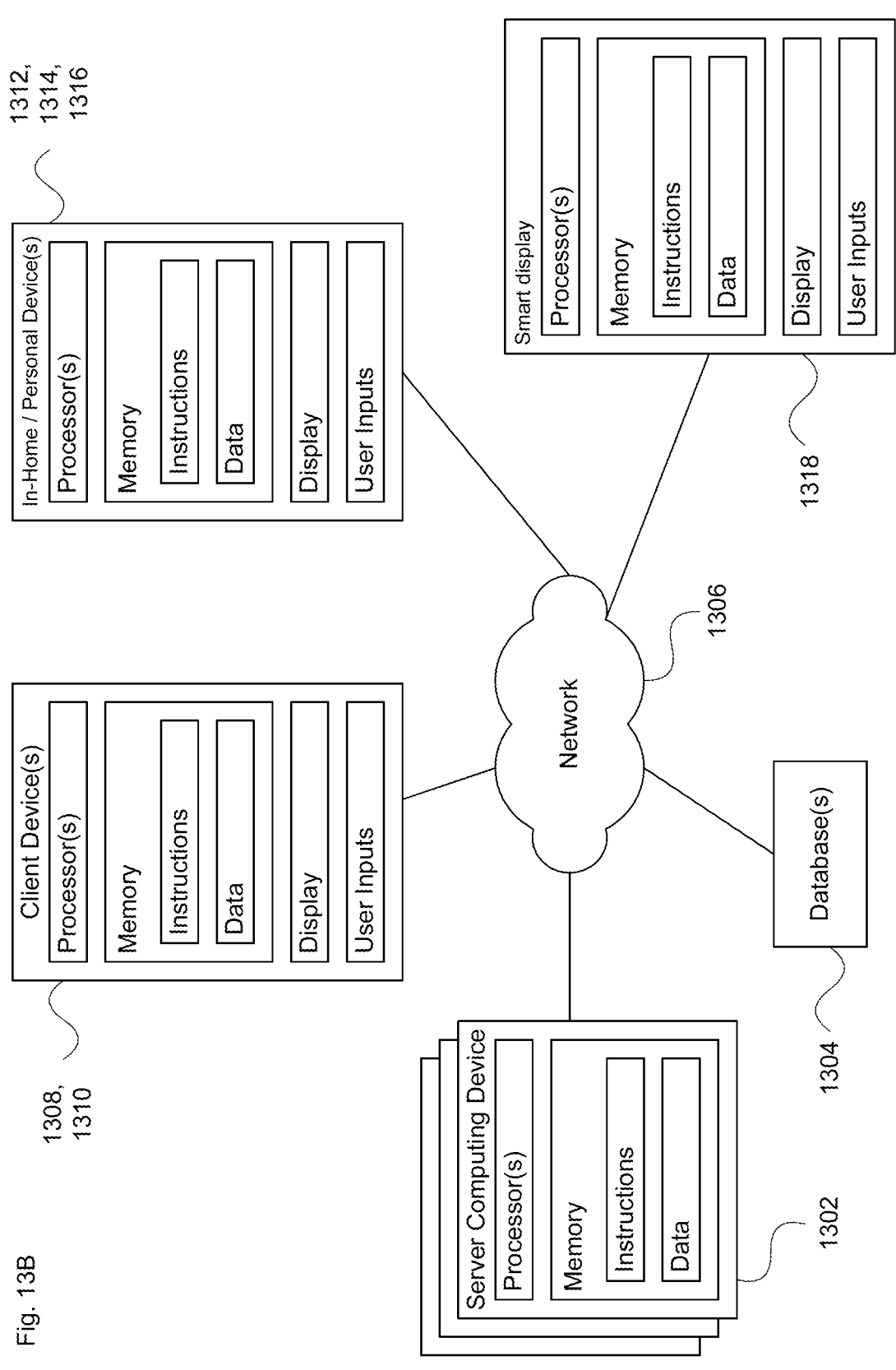

As noted above, one or more types of products can be updated from one operating system to another operating system. Updates may be performed on all devices in a product line, subsets (tranches) of devices for the product line, on multiple different product lines, etc. One example computing architecture that may be employed in these approaches is shown in FIGS. 13A and 13B. In particular, FIGS. 13A and 13B are pictorial and functional diagrams, respectively, of an example system 1300 that includes a plurality of computing devices and databases connected via a network. For instance, computing device(s) 1302 may be a cloud-based server system that provides or otherwise supports OS updates and/or other updates for various products. Database 1304 may store the updates and/or other information associated with the products. The server system may access the databases via network 1306. Client devices may include one or more of a desktop computer 1308, a laptop or tablet PC 1310, in-home devices such as may be moveable units (such as an at-home assistant device 1312a or a smart speaker 1312b), or fixed (such as a temperature/thermostat unit 1312c). Other client devices may include a personal communication device such as a mobile phone or PDA 1314 or a wearable device 1316 such as a smartwatch, etc. Another example client device is a large screen display or interactive whiteboard 1318, such as might be used in a classroom, conference room, auditorium or other collaborative gathering space where multiple users may be present.

In one example, computing device 1302 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1302 may include one or more server computing devices that are capable of communicating with any of the computing devices 1308-1318 via the network 1306. Here, the server computing devices may implement a backend update service and/or a product update service, each of which may server one or more types of products.

As shown in FIG. 13B, each of the computing devices 1302 and 1308-1318 may include one or more processors, memory, data and instructions. The memory stores information accessible by the one or more processors, including instructions and data that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs. Alternatively, each processor may be a dedicated device such as an ASIC, graphics processing unit (GPU), tensor processing unit (TPU) or other hardware-based processor. Although FIG. 13B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 1302. Accordingly, references to a processor or computing device will be understood to include references to a collection of processors or computing devices or memories that may or may not operate in parallel.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices that is operable to display information (e.g., text, imagery and/or other graphical elements). Other output devices, such as speaker(s) may also provide information to users. And as explained in detail above with regard to FIG. 2 each client device (e.g., any or all of 1308-1318) may include a human presence sensor module in addition to the above-described elements.

The user-related computing devices (e.g., 1308-318) may communicate with a back-end computing system (e.g., server 1302) via one or more networks, such as network 1306. The user-related computing devices may also communicate with one another without also communicating with a back-end computing system. The network 1306, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Exemplary Method of Operation

FIG. 14 illustrates a computer-implemented method 1400 that comprises, at block 1402, writing, by one or more processors of a computing device, a current operating system into memory of the computing device, the memory storing user data, the memory having a memory type. By way of example, user data is stored in a data format that is understood by the new operating system. This can be, e.g., either the kernel boot image format on eMMC devices or the raw NAND copy format (which may be multiple copies of a kernel boot image with some extra header data at the beginning to denote the count and integrity of the data) on unmanaged NAND devices. The memory type can indicate, e.g., either a raw/unmanaged NAND type or an eMMC storage type. At block 1404 the method includes receiving by the one or more processors, from an update system remote from the computing device, an update package for a build for a new operating system to be installed on the computing device. The update package includes a device image and an update component. The device image includes a kernel image for the new operating system and a new operating system resource allocator. At block 1406 the method includes writing, by the one or more processors, the build for the new operating system to storage in the memory of the computing device. The computing device is rebooted into a recovery mode at block 1408. And at block 1410, upon rebooting, the one or more processors execute a recovery program to configure new partitions in the memory in accordance with the memory type. The recovery program installs the new operating system in the new partitions based on data from the device image and the memory type, and the recovery program migrates the stored user data to a selected one of the new partitions.

FIG. 15 illustrates another computer-implemented method 1500. At block 1502 the method includes receiving, by a first update service module, an operating system image from a repository, in which the operating system image contains configuration data associated with a product. At block 1502 the method includes generating, by the first update service module, signed metadata for the operating system image based on a signing key. At block 1506 the method includes forming, by the first update service module, an update package including the signed metadata plus a base operating system image. At block 1508 the method includes creating, by a second update service module, a build containing one or more configuration files associated with the product. At block 1510 the method includes validating, by the second update service module, the update package of the build. At block 1512 the method includes generating, by the second update service module, a product signing key for the update package. And at block 1514 the method includes transmitting the update package with the product signing key to one or more computing devices according to an operating system migration process from a current operating system to a new operating system.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method, comprising:

writing, by one or more processors of a computing device, a current operating system to storage in memory of the computing device, the memory storing user data and having a memory type;

receiving by the one or more processors, from an update system remote from the computing device, an update package for a build for a new operating system to be installed on the computing device, the update package comprising a device image and an update component, wherein the device image includes a kernel image for the new operating system and a new operating system resource allocator;

writing, by the one or more processors, the build for the new operating system to storage in the memory of the computing device;

rebooting the computing device into a recovery mode; and upon the rebooting, the one or more processors executing a recovery program to configure new partitions in the memory in accordance with the memory type, the recovery program installing the new operating system in the new partitions based on data from the device image and the memory type, and the recovery program migrating the user data to a selected one of the new partitions.

2. The method of claim 1, wherein receiving the update package comprises receiving an over-the-air update from the update system.

3. The method of claim 1, wherein executing the recovery program includes:

creating a new operating system kernel boot image;

writing the new operating system kernel boot image to a reserved migration partition in the memory;

reading the new operating system kernel boot image from the migration partition; and packing data into one or more interfaces in a process communication system of the new operating system for distribution from the migration partition to corresponding portions of memory associated with the new operating system kernel boot image.

4. The method of claim 3, wherein the distribution includes distribution of platform data associated with the computing device and product data associated with one or more application features for applications to be run on the new operating system.

5. The method of claim 4, wherein:

the platform data includes a first set of application programming interfaces (APIs) to configure system-wide settings in the new operating system and a second set of APIs to configure one or more system-level components; and the product data includes one or more APIs for exposing selected data to application-level components configured to run in the new operating system.

6. The method of claim 1, further comprising:

prior to writing the current operating system to storage, downloading an airlock update to the computing device, wherein the airlock update includes a build having a partial rollout for the current operating system; and applying the airlock update for the current operating system.

7. The method of claim 1, wherein executing the recovery program includes:

writing a kernel for the new operating system to a boot partition of the memory according to the kernel image, writing the new operating system resource allocator to remaining space of a system partition of the memory, writing boot metadata to the memory, and moving the user data to a partition in the memory associated with the new operating system.

8. The method of claim 7, wherein executing the recovery program further includes updating a globally unique identifiers partition table associated with the memory.

9. The method of claim 1, wherein upon interruption of the method, the method further comprises:

falling back to a partition table of the current operating system; and restarting execution of the recovery program.

10. The method of claim 1, wherein the build for the new operating system is a base build, and the method further comprises upon executing the recovery program and installing the base build:

downloading a full build for the new operating system; and updating the new operating system from the base build to the full build.

11. The method of claim 10, wherein updating from the base build to the full build includes:

updating a bootloader for the new operating system;

replacing a recovery partition for the current operating system with a kernel recovery partition for the new operating system;

updating a B copy of the new operating system kernel;

updating system configuration data with verified boot information for the B copy of the system kernel, which holds a key and descriptors needed during startup to verify integrity of the device image; and rebooting the computing device into the full build of the new operating system.

12. The method of claim 11, further comprising:

downloading a most current build for the new operating system; and updating the new operating system from the full build to the most current build.

13. The method of claim 12, wherein updating from the full build to the most current build includes:

updating the bootloader for the new operating system;

updating the kernel recovery partition for the new operating system;

updating an A copy of the new operating system kernel;

updating system configuration data with verified boot information for the A copy of the system kernel; and reboot the computing device into the most current build of the new operating system.

14. The method of claim 1, wherein the memory type is an unmanaged memory type and the method further comprises implementing a flash translation library to provide block management for the unmanaged memory type.

15. The method of claim 1, wherein the memory type is a managed memory type.

16. The method of claim 1, wherein the update component includes a set of update binaries and metadata about the new operating system update.

17. The method of claim 1, wherein the new operating system resource allocator is a new operating system volume manager.

18. The method of claim 17, wherein the device image further includes one or more host tools configured to handle user data and writing the new operating system volume manager.

19. A computing device, comprising:

memory configured to store operating system information and user data in a set of partitions, the memory having a memory type; and one or more processors operatively coupled to the memory, the one or more processors being configured to:

write a current operating system of the computing device to storage in the memory of the computing device;

receive, from an update system remote from the computing device, an update package for a build for a new operating system to be installed on the computing device, the update package comprising a device image and an update component, wherein the device image includes a kernel image for the new operating system and a new operating system resource allocator;

write the build for the new operating system to storage in the memory of the computing device;

reboot the computing device into a recovery mode; and upon the reboot, execute a recovery program to configure new partitions in the memory in accordance with the memory type, the recovery program configured to install the new operating system in the new partitions based on data from the device image and the memory type, and to migrate the stored user data to a selected one of the new partitions.

20. The computing device of claim 19, wherein the memory type is either an unmanaged memory type or a managed memory type.

* * * * *